(12) United States Patent
Catteruccia et al.

(10) Patent No.: US 12,520,840 B2
(45) Date of Patent: Jan. 13, 2026

(54) METHOD FOR REDUCING PARASITE BURDEN IN A MOSQUITO

(71) Applicant: PRESIDENT AND FELLOWS OF HARVARD COLLEGE, Cambridge, MA (US)

(72) Inventors: Flaminia Catteruccia, Cambridge, MA (US); Douglas Graeme Paton, Cambridge, MA (US)

(73) Assignee: PRESIDENT AND FELLOWS OF HARVARD COLLEGE

( * ) Notice: Subject to any disclaimer, the term of this patent is extended or adjusted under 35 U.S.C. 154(b) by 101 days.

(21) Appl. No.: 17/271,384

(22) PCT Filed: Sep. 3, 2019

(86) PCT No.: PCT/US2019/049327
§ 371 (c)(1),
(2) Date: Feb. 25, 2021

(87) PCT Pub. No.: WO2020/051130
PCT Pub. Date: Mar. 12, 2020

(65) Prior Publication Data
US 2021/0330585 A1    Oct. 28, 2021

Related U.S. Application Data

(60) Provisional application No. 62/726,757, filed on Sep. 4, 2018.

(51) Int. Cl.
*A01N 35/06*    (2006.01)
*A01N 37/42*    (2006.01)
(Continued)

(52) U.S. Cl.
CPC .............. *A01N 35/06* (2013.01); *A01N 37/42* (2013.01); *A01N 43/60* (2013.01); *A61K 9/0017* (2013.01);
(Continued)

(58) Field of Classification Search
None
See application file for complete search history.

(56) References Cited

U.S. PATENT DOCUMENTS

| 2012/0115904 A1 | 5/2012 | Riscoe et al. |
| 2017/0022164 A1 | 1/2017 | Riscoe et al. |
| 2018/0213776 A1 | 8/2018 | Kakani et al. |

FOREIGN PATENT DOCUMENTS

| WO | WO-2014197703 A1 * | 12/2014 | ......... A61K 31/7048 |
| WO | WO-2017015600 A1 * | 1/2017 | .............. A01M 1/02 |
| WO | 2017222996 A2 | 12/2017 | |

OTHER PUBLICATIONS

Stickles et al., "Inhibition of Cytochrome bc1 as a Strategy for Single-Dose, Multi-Stage Antimalarial Therapy", Am. J. Trop. Med. Hyg., 92(6), 2015, pp. 1195-1201 (Year: 2015).*

* cited by examiner

*Primary Examiner* — Bethany P Barham
(74) *Attorney, Agent, or Firm* — NIXON PEABODY LLP; David S. Resnick; Jeanne N. Jodoin

(57) ABSTRACT

Described herein are methods and compositions for reducing transmission of *Plasmodium* to a female mosquito. Aspects of the invention relate to contacting to a mosquito with a *Plasmodium* transmission blocking compound. Another aspect of the invention relates to a surface coated with a *Plasmodium* transmission blocking compound.

10 Claims, 32 Drawing Sheets

(51) Int. Cl.
*A01N 43/60* (2006.01)
*A61K 9/00* (2006.01)
*A61K 31/122* (2006.01)
*A61K 31/222* (2006.01)
*A61K 31/357* (2006.01)
*A61K 31/4192* (2006.01)
*A61K 31/495* (2006.01)
*A61K 31/505* (2006.01)
*A61K 47/12* (2006.01)
*A61K 47/14* (2017.01)

(52) U.S. Cl.
CPC .......... *A61K 31/122* (2013.01); *A61K 31/222* (2013.01); *A61K 31/357* (2013.01); *A61K 31/4192* (2013.01); *A61K 31/495* (2013.01); *A61K 31/505* (2013.01); *A61K 47/12* (2013.01); *A61K 47/14* (2013.01)

Pyflubumide

| Compound | Vehicle | H Donors | H Acceptors | Rotational Bonds | Polar Surface Area (Å²) | Active Tarsally? | Target |
|---|---|---|---|---|---|---|---|
| Permethrin[a] | Acetone | 0 | 3 | 7 | 35.5 | Yes | Para sodium-gated ion channel (cell membrane) |
| Deltamethrin[a] | Acetone | 0 | 4 | 7 | 59.3 | Yes | Para sodium-gated ion channel (cell membrane) |
| Pyriproxifen[ab] | Acetone | 0 | 4 | 7 | 40.6 | Yes | Methoprene Tolerant (nucleus) |
| Chlorfenapyr[ab] | Acetone | 0 | 5 | 4 | 38 | Yes | Mitochondrial inter-membrane space |
| Piperonyl butoxide[ab] | Acetone | 0 | 5 | 13 | 46.2 | Yes | Cytochrome P450s |
| Atovaquone | Acetone | 1 | 3 | 2 | 54.4 | Yes[c] | Cytochrome B (mitochondrial inner membrane) |
| Hydramethylnon | Acetone | 2 | 8 | 6 | 48.8 | Yes[c] | Cytochrome B (mitochondrial inner membrane) |
| Acequinocyl | Acetone | 0 | 4 | 13 | 60.4 | Yes[c] | Cytochrome B (mitochondrial inner membrane) |
| Decoquinate | Chloroform | 1 | 6 | 15 | 73.89 | No[c] | Cytochrome B (mitochondrial inner membrane) |
| Pyrimethamine | Acetone (sparingly) | 2 | 4 | 2 | 77.8 | No[c] | Dihydrofolate Reductase-Thymidylate Synthase (cytosol) |

[a] approved for use in long-lasting inseciticide treated nets
[b] only in combination with permethrin/deltamethrin
[c] against Plasmodium falciparum infection

FIG. 10A

PYR

METHOD FOR REDUCING PARASITE BURDEN IN A MOSQUITO

CROSS-REFERENCE TO RELATED APPLICATIONS

This application is a 371 National Phase Entry of International Patent Application No. PCT/US2019/049327 filed Sep. 3, 2019, which claims benefit under 35 U.S.C. § 119(e) of U.S. Provisional Application No. 62/726,757 filed Sep. 4, 2018, the contents of which are incorporated herein by reference in their entirety.

GOVERNMENT SUPPORT

This invention was made with Government support under Grant No. AI124165-01 awarded by the National Institutes of Health. The Government has certain rights in the invention.

FIELD OF THE INVENTION

The field of the invention relates to the reduction of parasite burden in a mosquito.

BACKGROUND

Malaria is a deadly parasitic disease caused by the apicomplexan protozoa Plasmodium and spread by the bite of female Anopheles mosquitoes. Since the turn of the century, extensive efforts to prevent transmission of the disease via the control of the mosquito vector have been extremely successful. An estimated 663 million cases of malaria were averted between 2000 and 2015, primarily through the mass distribution of long-lasting insecticide treated nets (LLINs)[1]. However, resistance to pyrethroid insecticides used in LLINs has become widespread in Anopheles populations across much of the tropics, threatening a global recrudescence of the disease and bringing the need for novel malaria control interventions into sharp focus.

SUMMARY

A method for reducing transmission of Plasmodium to a female mosquito, the method comprising: contacting a female mosquito with a composition comprising an effective amount at least one Plasmodium transmission blocking compound.

Another aspect of the invention described herein provides a surface, wherein the surface comprises an effective amount of at least one Plasmodium transmission blocking compound. Exemplary surfaces include, but are not limited to, an interior wall of a building; an exterior wall of a building; a bed net; an indoor fabric; an outdoor fabric; clothing; inside a trap; and outside a trap. In one embodiment, the trap is a bait trap. In one embodiment, the composition is present on the surface at a concentration of 10 μmol/m²-1 mmol/m².

In one embodiment of any aspect presented herein, the at least one Plasmodium transmission blocking compound is an anti-malaria compound.

In one embodiment of any aspect presented herein, the at least one Plasmodium transmission blocking compound is an insecticide.

In one embodiment, the at least one Plasmodium transmission blocking compound is a dihydrofolate reductase inhibitor, a tRNA synthetase inhibitor, a dihydroorotate dehydrogenase inhibitor, a Complex V/ATP synthase inhibitor, an Oxidative phosphorylation uncoupler, and/or a Complex II/succinate dehydrogenase inhibitor.

In one embodiment of any aspect presented herein, the at least one Plasmodium transmission blocking compound is a mitochondria electron transport chain inhibitor. In one embodiment of any aspect presented herein, the at least one mtETC inhibitor is selected from the group consisting of: Amytal, Rotenone, Antimycin A, carbon monoxide (CO), Sodium Azide, and Cyanide.

In one embodiment of any aspect presented herein, the Antimycin A inhibitor is a cytochrome B inhibitor. In one embodiment of any aspect presented herein, the cytochrome B inhibitor is selected from the group consisting of: ELQ300, Menoctone, MMV665827, MMV006913, MMV666081, MMV666095, Fluacrypyrim, Bifenazate, Atovaquone ATQ, Hydramethylnon (HYD), or acaricide acequinocyl (ACE).

In one embodiment of any aspect presented herein, the cytochrome B inhibitor is Atovaquone ATQ, Hydramethylnon (HYD), or acaricide acequinocyl (ACE).

In one embodiment of any aspect presented herein, the contacting comprises topical contacting. In one embodiment of any aspect presented herein, the topical contacting comprises tarsal contact. In one embodiment of any aspect presented herein, the tarsal contact comprises tarsal absorption of the at least one Plasmodium transmission blocking compound.

In one embodiment of any aspect presented herein, the contacting occurs on a surface coated with the at least one Plasmodium transmission blocking compound. Exemplary surfaces include, but are not limited to, an interior wall of a building; an exterior wall of a building; a bed net; an indoor fabric; an outdoor fabric; clothing; inside a trap; and outside a trap. In one embodiment, the trap is a bait trap.

In one embodiment of any aspect presented herein, the female mosquitoes comprise Anopheles spp., Aedes spp., or Culex spp.

In one embodiment of any aspect presented herein, the female mosquito is an adult female mosquito.

In one embodiment of any aspect presented herein, reducing transmission inhibits the zygote/ookinete transition of Plasmodium development. In one embodiment, the zygote/ookinete transition is inhibited by at least 50%, 60%, 70%, 80%, 90%, 99%, or more, as compared to an appropriate control.

In one embodiment of any aspect presented herein, reducing transmission results in the inhibition of Plasmodium ookinete development. In one embodiment, ookinete development is inhibited by at least 50%, 60%, 70%, 80%, 90%, 99%, or more, as compared to an appropriate control.

In one embodiment of any aspect presented herein, the female mosquito has not been infected with Plasmodium prior to contacting. In one embodiment of any aspect presented herein, the female mosquito has been infected with Plasmodium prior to contacting.

In one embodiment of any aspect presented herein, the composition or surface further comprises at least one of a cuticular/tarsal uptake enhancer and a cytochrome P450 inhibitor. In one embodiment of any aspect presented herein, the cuticular/tarsal uptake enhancer comprises a mixture of the methyl esters of saturated and unsaturated C10-C26 fatty acids. In one embodiment of any aspect presented herein, the cuticular/tarsal uptake enhancer comprises rapeseed methyl ester. In one embodiment of any aspect presented herein, the cytochrome p450 inhibitor is at least one of piperonyl butoxide and 1-aminobenzotriazole.

Another aspect of the invention described herein provides a method comprising applying a composition comprising an effective amount of at least one *Plasmodium* transmission blocking compound to a surface. In one embodiment, the composition is present on the surface at a concentration of 10 μmol/m$^2$-1 mmol/m$^2$.

Definitions

For convenience, the meaning of some terms and phrases used in the specification, examples, and appended claims, are provided below. Unless stated otherwise, or implicit from context, the following terms and phrases include the meanings provided below. The definitions are provided to aid in describing particular embodiments, and are not intended to limit the claimed technology, because the scope of the technology is limited only by the claims. Unless otherwise defined, all technical and scientific terms used herein have the same meaning as commonly understood by one of ordinary skill in the art to which this technology belongs. If there is an apparent discrepancy between the usage of a term in the art and its definition provided herein, the definition provided within the specification shall prevail.

The term "effective amount" as used herein refers to the amount of a composition described herein that can be used that will have the desired effect, e.g., reduced transmission of *Plasmodium*. It is not generally practicable to specify an exact "effective amount". However, for any given case, an appropriate "effective amount" can be determined by one of ordinary skill in the art using only routine experimentation.

As used herein, a "*Plasmodium* transmission blocking compound" refers to a compound that results in or induces reduction or inhibition of any step of the *Plasmodium* transmission process. Specifically, the present invention is directed at targeting and blocking the development of the parasite in the mosquito. Said another way, a "*Plasmodium* transmission blocking compound" prevents or treats the parasite infection in the mosquito, preventing the mosquito from transmitting the parasite during a blood meal. Following exposure to a malaria parasite, e.g., via a blood meal, the mosquito ingests gametocyte, which will mate and generate the zygote. The zygote develops to an ookinete, a motile zygote that penetrates the mosquito's stomach to form an oocyst under the gut lining, and form an oocyst. Within the oocyst, thousands of sporozoites develop. Upon oocyst rupture, these sporozoites are released. Following release of the sporozoites, the mosquito can transmit the parasite to a subject during a blood meal, e.g., can transmit the parasite to a mammal, e.g., a human, by biting the subject. A compound described herein can directly block transmission by inhibiting or reducing the survival of a macrogamete, development of a macrogamete to a zygote, zygote to ookinete transition, ookinete development such that it does not form an oocyte, oocyte rupture, or sporozoites development. Further, a compound described herein can block transmission by inhibiting or reducing mating success of a female mosquito, egg development after blood feeding, and the mean survival rate of adult, female mosquitoes. An effective amount of a *Plasmodium* transmission blocking compound used herein can inhibit or reduce any of these processes by at least 10%, 15%, 20%, 25%, 30%, 35%, 40%, 45%, 50%, 55%, 60%, 65%, 70%, 75%, 80%, 85%, 90%, 95%, 99%, or more, as compared to an appropriate control. 100% inhibition of *Plasmodium* transmission is referred to here as complete inhibition of *Plasmodium* transmission. As used herein, an "appropriate control" refers to a mosquito that has not been contacted by the compound. One skilled in the art can assess the level of inhibition or reduction by visualizing or assessing a given process using standard techniques in the art and comparing a mosquito that has been contacted with a compound and an appropriate control.

The term "inhibitor" as used herein means any compound or substance such as, but not limited to, a small molecule, a drug, etc. An "inhibitor" can be any chemical, entity or moiety, including without limitation synthetic and naturally-occurring proteinaceous and non-proteinaceous entities. In some embodiments, an agent is nucleic acid, nucleic acid analogues, proteins, antibodies, peptides, aptamers, oligomer of nucleic acids, amino acids, or carbohydrates including without limitation proteins, oligonucleotides, ribozymes, DNAzymes, glycoproteins, siRNAs, lipoproteins, aptamers, and modifications and combinations thereof etc. In certain embodiments, agents are small molecule having a chemical moiety. For example, chemical moieties included unsubstituted or substituted alkyl, aromatic, or heterocyclyl moieties including macrolides, leptomycins and related natural products or analogues thereof. Compounds can be known to have a desired activity and/or property, or can be selected from a library of diverse compounds.

The inhibitor can be a molecule from one or more chemical classes, e.g., organic molecules, which may include organometallic molecules, inorganic molecules, genetic sequences, etc. Inhibitors may also be fusion proteins from one or more proteins, chimeric proteins (for example domain switching or homologous recombination of functionally significant regions of related or different molecules), synthetic proteins or other protein variations including substitutions, deletions, insertion and other variants.

As used herein, the term "small molecule" refers to a chemical agent which can include, but is not limited to, a peptide, a peptidomimetic, an amino acid, an amino acid analog, a polynucleotide, a polynucleotide analog, an aptamer, a nucleotide, a nucleotide analog, an organic or inorganic compound (e.g., including heterorganic and organometallic compounds) having a molecular weight less than about 10,000 grams per mole, organic or inorganic compounds having a molecular weight less than about 5,000 grams per mole, organic or inorganic compounds having a molecular weight less than about 1,000 grams per mole, organic or inorganic compounds having a molecular weight less than about 500 grams per mole, and salts, esters, and other pharmaceutically acceptable forms of such compounds.

The term "decrease", "reduced", "reduction", or "inhibit" are all used herein to mean a decrease by a statistically significant amount. In some embodiments, "decrease", "reduced", "reduction", or "inhibit" typically means a decrease by at least 10% as compared to an appropriate control (e.g. the absence of a given composition) and can include, for example, a decrease by at least about 10%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, at least about 95%, at least about 98%, at least about 99%, or more. As used herein, "reduction" or "inhibition" does not encompass a complete inhibition or reduction as compared to a reference level. "Complete inhibition" is a 100% inhibition as compared to an appropriate control.

As used herein, a "reference level" refers to a normal, otherwise unaffected mosquito (e.g., a mosquito prior to contact with an inhibitor, or a mosquito prior to infection with *Plasmodium*).

As used herein, an "appropriate control" refers to an untreated, otherwise identical mosquito or population thereof (e.g., a mosquito who was not contacted with an inhibitor described herein, or was contacted by only a subset of agents described herein, as compared to a non-control mosquito or population thereof).

The term "statistically significant" or "significantly" refers to statistical significance and generally means a two standard deviation (2SD) or greater difference.

As used herein the term "comprising" or "comprises" is used in reference to compositions, methods, and respective component(s) thereof, that are essential to the method or composition, yet open to the inclusion of unspecified elements, whether essential or not.

The singular terms "a," "an," and "the" include plural referents unless context clearly indicates otherwise. Similarly, the word "or" is intended to include "and" unless the context clearly indicates otherwise. Although methods and materials similar or equivalent to those described herein can be used in the practice or testing of this disclosure, suitable methods and materials are described below. The abbreviation, "e.g." is derived from the Latin exempli gratia, and is used herein to indicate a non-limiting example. Thus, the abbreviation "e.g." is synonymous with the term "for example."

BRIEF DESCRIPTION OF THE DRAWINGS

(FIG. 1a) No *P. falciparum* oocysts (0% intensity, and 0% prevalence of infection, shown in the pie charts) are detected in females exposed to 1 mmol/m2 ATQ for 60 minutes immediately prior to infection (Chi2, df=1 p<0.0001). (FIG. 1b) Dose-dependent inhibition (range: 1 mmol/m2-100 nmol/m2) of *P. falciparum* infection by exposure of ATQ. (FIG. 1c) Dose-response curve fit for ATQ exposure (Non-linear regression, df=1, R2=0.9441). The IC50 for ATQ pre-infection exposure, calculated by interpolation, is indicated. Error bars are 95% CI. Dashed portions of the sigmoidal fit are estimated. In all panels where relevant, statistical significance is indicated as so: ns=not significant, * p<0.05,  p<0.01, * p<0.001, **** p<0.0001. Medians are indicated. Whenever relevant, n indicates the sample size.

(FIG. 2a) No *P. falciparum* oocysts (0% intensity, and 0% prevalence of infection, shown in the pie charts) are observed on the midguts of mosquitoes exposed to either 1 mmol/m2 or 100 μmol/m2 ATQ for 6 min (Chi2, df=1, p<0.0001). At 10 μmol/m2, prevalence of infection is significantly reduced in ATQ-treated females (Chi2, df=1, p<0.0001), and there is also a significant reduction in median oocyst intensity in this group (Mann-Whitney, df=1, p=0.0349). Medians are indicated. (FIG. 2b) IFA of mosquito midgut lumen 21 h post *P. falciparum* infection using parasite-specific (anti-PfS25, green) and DNA (DAPI, blue) staining. No ookinete are detected in ATQ, while controls contain large numbers of normal ookinetes. ATQ-exposed mosquitoes show retort forms, indicating parasite arrest. Scale bar: 10 μm. Where relevant statistical significance is indicated as so: ns=not significant, * p<0.05,  p<0.01, * p<0.001, **** p<0.0001. Whenever relevant, n indicates the sample size.

(FIG. 5a) ATQ exposure has no effect on the acute or long-term survival of *An. gambiae* females (Log Rank Mantel-Cox, df=1, p=0.9951). The sigmoidal fit used for subsequent modeling is shown. (FIG. 5b) The production of eggs after an infections blood meal is unaffected by ATQ exposure (Student's t, df=1, p=0.5132). Means and 95% CI are indicated. Where relevant statistical significance is indicated as so: ns=not significant, * p<0.05,  p<0.01, * p<0.001, **** p<0.0001. Whenever relevant, n indicates the sample size.

(FIG. 6a) Schematic representation of the mosquito life cycle model with the time step of one day. Mosquitoes spend three days as eggs (Ei), ten days as larvae (Li), which includes the pupal stage. Adult female mosquito compartments fall within the dashed box and begin with a rest day (R0) followed by mating (M) or feeding (F). After feeding females undergo two days of rest (Ri) followed by a day for egg laying (EL). Then the cycle repeats. Shaded boxes denote when exposure to insecticide or ATQ could occur. These are the same compartments were mosquitoes can become infected or transmit infections, assuming they have been infected for a period longer than the incubation time. (FIG. 6b) Survival of the mosquito population as a function of age. The curve is a Gompertz distribution with scale parameter b=0.1868 and shape parameter η=0.0293. (FIG. 6c) Functions relating human and mosquito infection levels with risk of infection. (i) The risk of a human becoming infected, βH, as a function of the number of infectious feeders, f. (ii) The risk of a mosquito becoming infected, βM, as a function of the fraction of the human population that is infected, IH.

FIGS. 10A-10D shows chemical and physical properties of tested compounds and in-use LLIN insecticides.

Figure 1A:
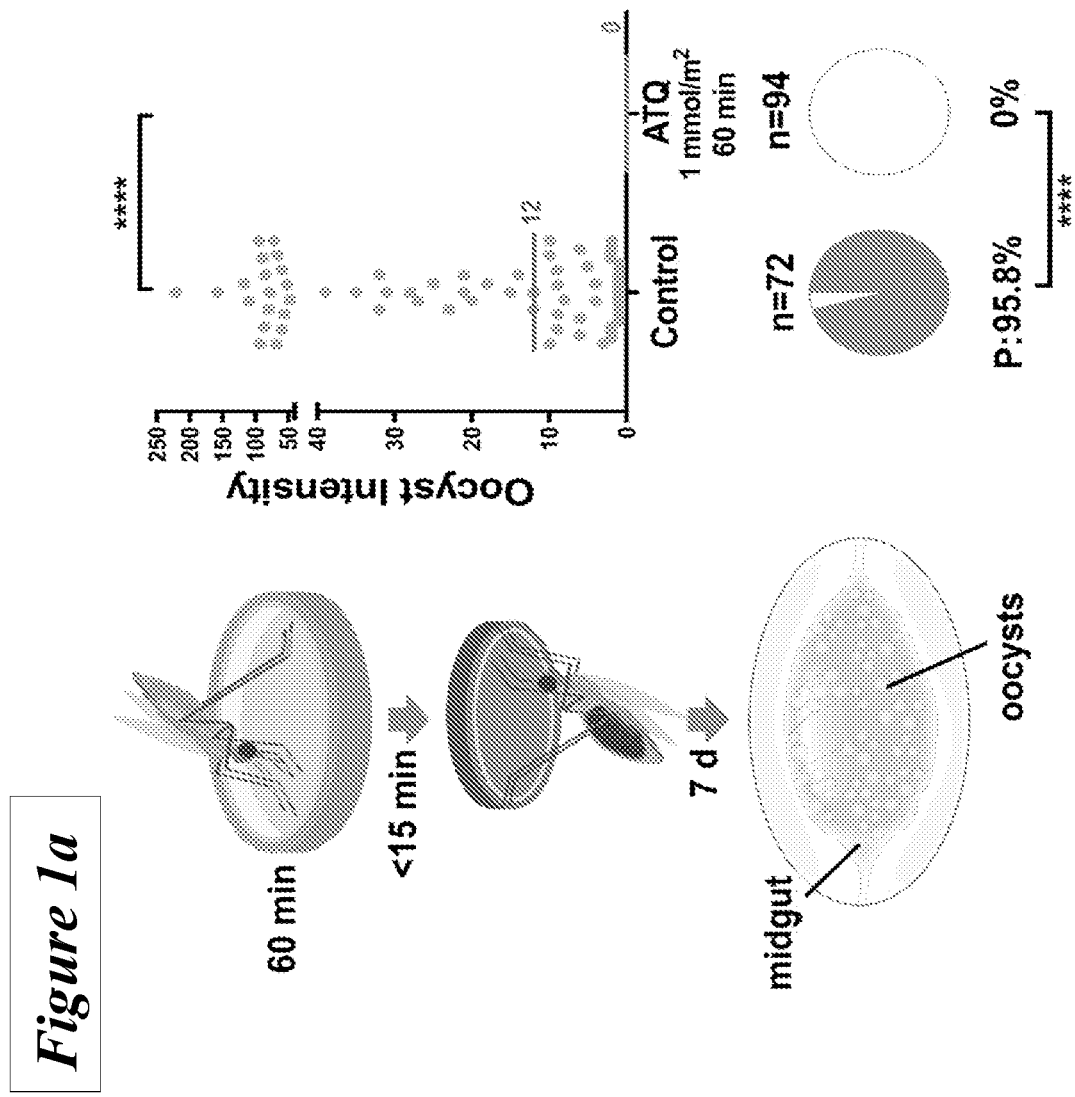
FIGS. 1a-1c show *an. gambiae* exposure to atovaquone (ATQ) kills *P. falciparum* parasites.

Where relevant statistical significance is indicated as so: ns=not significant, * $p<0.05$,  $p<0.01$, * $p<0.001$, **** $p<0.0001$.

DETAILED DESCRIPTION

The invention presented herein is based, in part, on the finding that in vivo mosquito-stage development of *Plasmodium falciparum* is rapidly and completely blocked when *Anopheles gambiae* females are transiently exposed to the cytochrome B inhibitor atovaquone (ATQ) by landing on an ATQ-coated surface prior to receiving an infectious blood meal. Specifically, contact for 6 minutes with a surface treated with the equivalent of 100 µmol/m2 ATQ was sufficient to kill all parasites at the ookinete stage, thereby preventing transmission of infection. Further, exposure to other cytochrome B inhibitors provided similar results, suggesting that the mitochondrial electron transport chain (mtETC) is a good target for transmission-blocking strategies aimed at the mosquito vector.

Finally, presented herein is a model of malaria transmission dynamics, which predicts that when included into LLINs, inhibitors of these key parasite functions would strongly potentiate the transmission-blocking function of partially or even completely ineffective insecticides. This model is supported by and incorporates data presented herein. These data indicate that simple improvements in the design of the best malaria control tools could significantly increase the effectiveness of current malaria control strategies.

Malaria Transmission

Malaria is a mosquito-borne disease caused by a *Plasmodium* parasite. People with malaria often experience fever, chills, and flu-like illness. Left untreated, severe complications can develop, including death. In 2016 an estimated 216 million cases of malaria occurred worldwide and 445,000 people died, mostly children in the African Region. However, roughly 1,700 cases of malaria are diagnosed in the United States each year.

Transmission of malaria occurs through a vector, the mosquito, that ingests gametocytes the sexual form of the parasite when feeding on an infected human. Gametocytes, which are both male and female, mate within the gut of the mosquito and undergo meiosis and then migrate through the midgut wall of the mosquito, developing into a zygote. The zygote will undergo the zygote to ookinete transition, forming the ookinete, a motile zygote that penetrates the mosquito's stomach to form an oocyst under the gut lining. Within the oocyst, thousands of sporozoites develop. Upon oocyst rupture, these sporozoites are released. These are then injected into a human during the next blood meal(s), where they rapidly make their way to the liver and infect hepatocytes and begin asexually (mitotically) replicating. After a period of ca. 6 15 days, the liver schizonts rupture, releasing thousands of merozoites into the blood where they invade red blood cells. Over the next ca. 48 h, the parasite begins replicating mitotically, progressing through a set of stages (ring, trophozoite and schizont), and produces an average of 16 new daughter merozoites per schizont. The schizonts then burst in near synchrony with other parasites, producing the characteristic fever cycle that embodies the clinical manifestations of the disease. With each replication, some of the merozoites, instead of producing new merozoites, develop into gametocytes, which can then infect susceptible mosquitoes, bringing the transmission cycle full circle.

In various aspects herein, at least one step of malaria transmission is blocked following contacting a female mosquito with a composition comprising at least one *Plasmodium* transmission blocking compound. In one embodiment, the contacting occurs on a surface coated with the composition.

It is specifically contemplated herein that the methods and surfaces provided herein can be additionally used to reduce transmission of at least one mosquito borne pathogen. As used herein, the term "mosquito borne pathogens" includes, but is not limited to, *Plasmodium*, Filarioidea-type roundworm larvae, o'nyong'nyong virus, dengue, yellow fever virus, West Nile virus, chikungunya virus, Eastern equine virus, Japanese encephalitis virus, Zika virus or combinations thereof.

Compositions

One aspect herein provides a method for reducing transmission of *Plasmodium* to a female mosquito comprising contacting a female mosquito with a composition comprising an effective amount at least one *Plasmodium* transmission blocking compound.

Another aspect herein provides an indoor or outdoor surface for the reduction of *Plasmodium* transmission in a female mosquito, wherein the surface comprises a composition comprising an effective amount of at least one mtETC inhibitor.

As used herein, the term "reducing *Plasmodium* transmission" generally refers to reducing the ratio of infective to non-infective adult, female mosquitoes from about 1.2 to about 0.05 (e.g., about 1.1 to about 0.1, about 0.8 to about 0.25, about 0.75 to about 0.3) relative to control (e.g., no contact with a composition described herein relative to contact with a composition described herein). An "effective amount of at least one *Plasmodium* transmission blocking compounds" is one that achieves these reductions. For example, in a control group, the percentages of infective and non-infective adult, female mosquitoes might be 50% and 50% respectively. And in the group that is in contact with the composition, the percentages of infective and non-infective adult, female mosquitoes might be 7.5% and 92.5%, respectively. The ratio of the percentages of infective and non-infective adult, female mosquitoes is therefore about 1. And the ratio of the percentages of infective and non-infective mosquitoes is about 0.08. The ratio of the percentages of infective and non-infective mosquitoes has therefore been reduced from about 1 to about 0.08 in the group that is in contact with the composition, relative to the control group.

In one embodiment, the composition described herein comprises at least 1, 2, 3, 4, 5, 6, 7, 8, 9, 10, or more *Plasmodium* transmission blocking compounds.

The compositions of the various embodiments of the present invention comprise various inert and active ingredients known in the art. Examples of the various ingredients contained in the compositions described herein include carriers (e.g., organic solvents, such as alkanols, such as ethanol; aromatics, such as xylenes; ketones, such as acetone; plant-derived oils, such as those derived from corncobs; and petroleum fractions), emulsifiers, stabilizers, cuticular/tarsal uptake enhancers, and cytochrome P450 inhibitors (e.g., piperonyl butoxide, 1-aminobenzotriazole, alpha-naphthoflavone, beta-naphthoflavone, apigenin, baicalein, beta-myrcene, catechin, 3-phenylpropyl acetate, formononetin, gallic acid, hesperetin, hesperidin, isoquercitrin, lauryl alcohol, luteolin, luteolin-7-glycoside, narigin, nordihydroguaiaretic acid, quercitrin, swertiamarin, terpineol, and trans-cinnamaldehyde).

In one embodiment, the composition or surface further comprises an agent that enhances tarsal or cuticular uptake in the mosquito. In one embodiment, the composition or surface further comprises at least one of a cuticular/tarsal uptake enhancer and a cytochrome P450 inhibitor. Non-limiting examples of cuticular/tarsal uptake enhancers include a mixture of saturated or unsaturated C10-C26 fatty acids (e.g., C12-C20, C16-C22, C12-C18, and C14-C22 fatty acids) and/or their corresponding C1-C6 alkyl esters (e.g., C1-C3 and C2-C5 alkyl esters of C12-C20, C16-C22, C12-C18, and C14-C22 fatty acids). In some embodiments, cuticular/tarsal uptake enhancers include a mixture of alkyl esters of saturated or unsaturated C10-C26 fatty acids (e.g., alkyl esters of C12-C20, C16-C22, C12-C18, and C14-C22 fatty acids). Cuticular/tarsal uptake enhancers also include a mixture of methyl esters of saturated or unsaturated C10-C26 fatty acids (e.g., alkyl esters of C12-C20, C16-C22, C12-C18, and C14-C22 fatty acids), including, for example, rapeseed methyl ester.

In various embodiments, the cuticular/tarsal uptake enhancer is a mixture of the methyl esters of saturated and unsaturated C10-C26 fatty acids, or rapeseed methyl ester. In one embodiment, the cytochrome p450 inhibitor is at least one of piperonyl butoxide and 1-aminobenzotriazole.

As used herein, the term "alkyl" includes straight, branched, and cyclic $C_i$-C6 alkyl groups. Examples of straight $C_i$-C6 alkyl groups include methyl, ethyl, propyl, butyl, and hexyl. Examples of branched $C_i$-C6 alkyl groups include isopropyl, ter-butyl, and neopentyl. Examples of cyclic $C_i$-C6 alkyl include cyclopropyl, cyclobuyl, cyclopentyl, and cycloxexyl.

In one embodiment, the composition contacts the female mosquito via topical contact. In another embodiment, the composition contacts the female mosquito via tarsal contact. As used herein, the term "contact" and "contacting" comprise situations when any external surface on a mosquito comes in contact with the *Plasmodium* transmission blocking compounds. The term "contact" and "contacting" therefore comprises contact with any surface on a mosquito, hence "topical contact," including contact with one or more of a mosquito's head or any part thereof (e.g., proboscis, flagellomere, antennae, palps, eyes, and occiput); thorax or any part thereof (e.g., antepronotum, scutum, scutellum, postnotum, and halter); abdomen (e.g., any one or more of the abdominal segments and the cercus); wings; and legs (e.g., foreleg, including tarsomeres, tibia, and femur midleg; and hind-leg). In some embodiments, the topical contact comprises contact with one or both of the tarsa of the mosquito, such that the topical contacting comprises tarsal contact. In some embodiments, the tarsal contact comprises tarsal absorption of the one or more *Plasmodium* transmission blocking compounds.

In one embodiment, the contact occurs on a surface that is coated with the composition described herein. Surfaces are further described herein below.

In one embodiment, the composition is present on the surface at a concentration of 10 $\mu mol/m^2$-1 $mmol/m^2$. In another embodiment, the composition is present on the surface at a concentration of 10 $\mu mol/m^2$-20 $\mu mol/m^2$, 10 $\mu mol/m^2$-30 $\mu mol/m^2$, 10 $\mu mol/m^2$-40 $\mu mol/m^2$, 10 $\mu mol/m^2$-50 $\mu mol/m^2$, 10 $\mu mol/m^2$-60 $\mu mol/m^2$, 10 $\mu mol/m^2$-70 $\mu mol/m^2$, 10 $\mu mol/m^2$-80 $\mu mol/m^2$, 10 $\mu mol/m^2$-90 $\mu mol/m^2$, 10 $\mu mol/m^2$-100 $\mu mol/m^2$, 20 $\mu mol/m^2$-100 $\mu mol/m^2$, 30 $\mu mol/m^2$-100 $\mu mol/m^2$, 40 $\mu mol/m^2$-100 $\mu mol/m^2$, 50 $\mu mol/m^2$-100 $\mu mol/m^2$, 60 $\mu mol/m^2$-100 $\mu mol/m^2$, 70 $\mu mol/m^2$-100 $\mu mol/m^2$, 80 $\mu mol/m^2$-100 $\mu mol/m^2$, 90 $\mu mol/m^2$-100 $\mu mol/m^2$, 100 $\mu mol/m^2$-200 $\mu mol/m^2$, 100 $\mu mol/m^2$-300 $\mu mol/m^2$, 100 $\mu mol/m^2$-400 $\mu mol/m^2$, 100 $\mu mol/m^2$-500 $\mu mol/m^2$, 100 $\mu mol/m^2$-600 $\mu mol/m^2$, 100 $\mu mol/m^2$-700 $\mu mol/m^2$, 100 $\mu mol/m^2$-800 $\mu mol/m^2$, 100 $\mu mol/m^2$-900 $\mu mol/m^2$, 100 $\mu mol/m^2$-1 $mmol/m^2$, 100 $\mu mol/m^2$-1 $mmol/m^2$, 200 $\mu mol/m^2$-1 $mmol/m^2$, 300 $\mu mol/m^2$-1 $mmol/m^2$, 400 $\mu mol/m^2$-1 $mmol/m^2$, 500 $\mu mol/m^2$-1 $mmol/m^2$, 600 $\mu mol/m^2$-1 $mmol/m^2$, 700 $\mu mol/m^2$-1 $mmol/m^2$, 800 $\mu mol/m^2$-1 $mmol/m^2$, or 900 $\mu mol/m^2$-1 $mmol/m^2$. In one embodiment, the composition is present on the surface at a concentration lower than 10 $\mu mol/m^2$. In one embodiment, the composition is present on the surface at a concentration higher than 1 $mmol/m^2$.

In one embodiment, the female mosquito is an adult female mosquito. In some embodiments, the methods are also generally applicable to adult, females of the order diptera, adult, female mosquitoes of other genera, and fruit flies. In some embodiments, the methods are also generally applicable to adult, female lepidopterans.

The species of mosquitoes to which the methods of the various embodiments of the present invention applicable are not limited. Examples of species of mosquitoes to which the methods of the various embodiments of the present invention apply include *Anopheles* spp (e.g., *An. arabiensis, An. funestus* and *An. stephensi*), *Aedes* spp or *Culex* spp, including adult, female mosquitoes of those species.

In one embodiment, the female mosquito has not been infected with *Plasmodium*. In one embodiment, the female mosquito has been infected with *Plasmodium*. One skilled in the art can determine is a female mosquito has been infected with *Plasmodium*, for example, by assessing if the mosquito has *Plasmodium* ookinetes using immunofluorescence techniques described herein in the material and methods section of the Examples, or by assessing whether the mosquito is carrying *Plasmodium* DNA via PCR-based analysis. A mosquito that has not been infected with *Plasmodium* will not have *Plasmodium* ookinetes or carry *Plasmodium* DNA.

In one embodiment, the composition described herein reduces transmission of *Plasmodium*. As used herein, "reduces transmission of *Plasmodium*" refers to the inhibition of zygote/ookinete transition of *Plasmodium* development. In one embodiment, the zygote/ookinete transition is inhibited by at least 10%, 15%, 20%, 25%, 30%, 35%, 40%, 45%, 50%, 55%, 60%, 65%, 70%, 75%, 80%, 85%, 90%, 95%, 99%, or more, as compared to an appropriate control. 100% inhibition of the zygote/ookinete transition is referred to here as complete inhibition of the zygote/ookinete transition. Immunofluorescence techniques that visual the presence of ookinetes, as described herein in the Examples, can be used to determine if the zygote/ookinete transition has been inhibited. As used herein, an appropriate control refers to a mosquito that has not been contacted by the composition.

In one embodiment, the composition described herein reduces transmission of *Plasmodium*. As used herein, "reduces transmission of *Plasmodium*" refers to the inhibition of *Plasmodium* ookinete development. In one embodiment, the *Plasmodium* ookinete development is inhibited by at least 10%, 15%, 20%, 25%, 30%, 35%, 40%, 45%, 50%, 55%, 60%, 65%, 70%, 75%, 80%, 85%, 90%, 95%, 99%, or more, as compared to an appropriate control. 100% inhibition of the *Plasmodium* ookinete development is referred to here as complete inhibition of *Plasmodium* ookinete development. Immunofluorescence techniques that visual the stage of development for ookinetes present in the mosquito, as described herein in the Examples, can be used to determine if the zygote/ookinete transition has been inhibited. As used herein, an appropriate control refers to a mosquito that has not been contacted by the composition.

*Plasmodium* Transmission Blocking Compound

In one embodiment, the composition comprises at least one *Plasmodium* transmission blocking compound. In one embodiment, the comprises at least one *Plasmodium* transmission blocking compound is, or has been previously used as, an anti-malaria compound, or an insecticide. In one embodiment, the anti-malaria compound has been previously used as therapeutic treatment for a subject having malaria, e.g., a mammal or human. In another embodiment, the anti-malaria compound has been previously used as prophylactic treatment for a subject at risk of having malaria, e.g., a mammal or human who has been or may be exposed to the malaria causing parasite.

In one embodiment, the at least one *Plasmodium* transmission blocking compound selected from Table 1.

TABLE 1

Transmission blocking compounds.

| Plasmodium Transmission Blocking Compounds | Type of Compound | Mode of action | Notes |
|---|---|---|---|
| Proguanil | anti-malarial | unknown/dihydrofolate reductase inhibitor | |
| Trimethoprim | anti-malarial | dihydrofolate reductase inhibitor | |
| Trimetrexate | anti-malarial | dihydrofolate reductase inhibitor | |
| Halofuginone | anti-malarial | tRNA synthetase inhibitor | |
| Bicyclic azetidines | anti-malarial | tRNA synthetase inhibitor | |
| 8-aminoquinolines | anti-malarial | unknown | |
| ELQ300 | anti-malarial | Complex III/Cytochrome B Inhibitor | mtETC |

TABLE 1-continued

Transmission blocking compounds.

| Plasmodium Transmission Blocking Compounds | Type of Compound | Mode of action | Notes |
|---|---|---|---|
| Menoctone | anti-malarial | Complex III/Cytochrome B Inhibitor | mtETC |
| MMV665827 | anti-malarial | Complex III/Cytochrome B Inhibitor | mtETC |
| MMV006913 | anti-malarial | Complex III/Cytochrome B Inhibitor | mtETC |
| MMV666081 | anti-malarial | Complex III/Cytochrome B Inhibitor | mtETC |
| MMV666095 | anti-malarial | Complex III/Cytochrome B Inhibitor | mtETC |
| MMV665874 | anti-malarial | dihydroorotate dehydrogenase inhibitor | |
| MMV00625 | anti-malarial | dihydroorotate dehydrogenase inhibitor | |
| MMV019258 | anti-malarial | dihydroorotate dehydrogenase inhibitor | |
| MMV008294 | anti-malarial | dihydroorotate dehydrogenase inhibitor | |
| DSM265 | anti-malarial | dihydroorotate dehydrogenase inhibitor | |
| Triazolpyrimidines | anti-malarial | dihydroorotate dehydrogenase inhibitor | |
| Diafenthiuron | Insecticide | Complex V/ATP synthase inhibitor | mtETC |
| Azocyclotin | Insecticide | Complex V/ATP synthase inhibitor | mtETC |
| Cyhexatin | Insecticide | Complex V/ATP synthase inhibitor | mtETC |
| Fenbutatin Oxide | Insecticide | Complex V/ATP synthase inhibitor | mtETC |
| Propargite | Insecticide | Complex V/ATP synthase inhibitor | mtETC |
| Tetradifon | Insecticide | Complex V/ATP synthase inhibitor | mtETC |
| Chlorfenapyr | Insecticide | Oxidative phosphorolation uncoupler | mtETC |
| DNOC | Insecticide | Oxidative phosphorolation uncoupler | mtETC |
| Sulfuramid | Insecticide | Oxidative phosphorolation uncoupler | mtETC |
| Fluacrypyrim | Insecticide | Complex III/Cytochrome B Inhibitor | mtETC |
| Bifenazate | Insecticide | Complex III/Cytochrome B Inhibitor | mtETC |
| Cyenopyrafen | Insecticide | Complex II/succinate dehydrogenase inhibitor | mtETC |
| Cyflumetofen | Insecticide | Complex II/succinate dehydrogenase inhibitor | mtETC |
| Pyflubumide | Insecticide | Complex II/succinate dehydrogenase inhibitor | |

In Table 1, "MMV" refers to medicines for malaria ventures.

In one embodiment, the at least one *Plasmodium* transmission blocking compound is a derivative, either naturally occurring or synthetic, of a compound in Table 1. The derivative can be a known derivative, yet to be discovered derivative of a compound listed in Table 1.

In one embodiment, the at least one *Plasmodium* transmission blocking compound is a dihydrofolate reductase inhibitor, a tRNA synthetase inhibitor, a dihydroorotate dehydrogenase inhibitor, a Complex V/ATP synthase inhibitor, an Oxidative phosphorylation uncoupler, and/or a Complex II/succinate dehydrogenase inhibitor.

Exemplary dihydrofolate reductase inhibitors include Proguanil, Trimethoprim, and Trimetrexate; exemplary tRNA synthetase inhibitors include Halofuginone, and Bicyclic azetidines; exemplary dihydroorotate dehydrogenase inhibitors include MMV665874, MMV00625, MMV019258, MMV008294, DSM265, and Triazolpyrimidines; exemplary Complex V/ATP synthase inhibitors include Diafenthiuron, Azocyclotin, Cyhexatin, Fenbutatin Oxide, Propargite, and Tetradifon; exemplary Oxidative phosphorylation uncouplers include Chlorfenapyr, DNOC, and Sulfuramid; and exemplary Complex II/succinate dehydrogenase inhibitors include Cyenopyrafen, Cyflumetofen, and Pyflubumide.

In one embodiment, the at least one *Plasmodium* transmission blocking compound is a mitochondria electron transport chain inhibitor. Exemplary mtETC inhibitors include, but are not limited to, Amytal, Rotenone, Antimycin A, carbon monoxide (CO), Sodium Azide, and Cyanide.

Amytal is a barbiturate, and Rotenone is a plant product used as insecticide and pesticide. Both Amytal and Rotenone block the ETC between NADH dehydrogenase (Complex I) and CoQ, and both prevent the utilization of NADH as a substrate.

Antimycin A is an antibiotic produced by *Streptomyces griseous* that has been used as a piscicide for the control of some fish species. Antymicine A interferes with electron flow from cytochrome bH in Complex III (Q-cytochrome c oxidoreductase). In the presence of this substance, cytochrome bH can be reduced but not oxidized. Consequently, in the presence of antimycin A cytochrome c remains oxidized, as do the cytochromes a and a3 that are ahead.

Carbon monoxide (CO) is colorless and odorless, and is responsible for more than 50% of death by poisoning worldwide. CO intoxication causes impaired oxygen delivery and utilization at the cellular level. The affinity of Hb for CO is almost 300 times higher than for Oxygen. An environment in which there is 100 ppm of CO is enough to form 16% carboxyhemoglobin. The situation is worsened since the binding of CO to one of the Hem groups of Hemoglobin increases the affinity of the other three Hem groups for Oxygen, so the delivery of Oxygen to tissues is very affected. The brain and the heart, that has a high Oxygen consumption, are the most affected. Myoglobin has even a greater affinity for CO than Hemoglobin. As a consequence of the binding of CO to these molecules, the heart functioning is very impaired and the patient presents sever hypotension. CO binds to the reduced form of iron in Hem groups (Fe++) in cytochrome Oxidase.

Cyanide affects practically all metalloenzymes, but its principal toxicity derives from the binding to the Fe+++ in the Hem groups in cytochrome Oxidase, inhibiting the functioning of the Electron Transport Chain. As a consequence, redox reactions in the respiratory chain will stop, energy will not be released, proton pumps will not function, so they will not return through Complex V, and the production of ATP will cease (Related question here).

Azides have an action on the respiratory chain very similar to cyanide, inhibiting the Hem groups of cytochromes in Cytochrome Oxidase (Complex IV). Azides are used as propellants in airbags, in detonant (explosive) industry and as preservative of sera an reagents. Some cases of azide intoxication in humans have been reported.

In one embodiment, the composition comprises at least one mtETC inhibitor selected from the group consisting of Amytal, Rotenone, Antimycin A, carbon monoxide (CO), Sodium Azide, and Cyanide. In one embodiment, the composition comprises at least 2, at least 3, at least 4, at least 5, at least 6, or more mtETC inhibitors.

In one embodiment, the antimycin A inhibitor is a cytochrome B inhibitor.

In one embodiment, the cytochrome B inhibitor ELQ300, Menoctone, MMV665827, MMV006913, MMV666081, MMV666095, Fluacrypyrim, Bifenazate, Atovaquone ATQ, Hydramethylnon (HYD), or acaricide acequinocyl (ACE).

The inhibitor may function directly in the form in which it is administered. Alternatively, the inhibitor can be modified or utilized intracellularly to produce something which inhibits *Plasmodium* transmission, such as introduction of a nucleic acid sequence into the cell and its transcription resulting in the production of the nucleic acid and/or protein inhibitor of SerpinB1, or nucleic acid and/or protein that targets CXCR6 within the cell. In some embodiments, the inhibitor is any chemical, entity or moiety, including without limitation synthetic and naturally-occurring non-proteinaceous entities. In certain embodiments the inhibitor is a small molecule having a chemical moiety. For example, chemical moieties included unsubstituted or substituted alkyl, aromatic, or heterocyclyl moieties including macrolides, leptomycins and related natural products or analogues thereof. Inhibitor can be known to have a desired activity and/or property, or can be identified from a library of diverse compounds.

In various embodiments, the agent is a small molecule that inhibits mtETC. Methods for screening small molecules are known in the art and can be used to identify a small molecule that is efficient at, for example, inhibiting zygote/ookinete transition of *Plasmodium* development, given the desired target (e.g., mtETC).

Surfaces

As used herein, the term "surface" includes any outside part or uppermost layer of an item, whether located indoor, outdoor, or on a person. Surfaces include, but are not limited to, an interior or exterior wall of a building; a door frame, support beam or post; a road sign and/or pole holding said sign; a power or telephone line and/or pole supporting said power line; light fixtures; a window; a bed net; an indoor or outdoor fabric (e.g., hammocks, rope, curtains, pillows, pillow cases, sofa or chair covering, bed sheets, bed skirts, duvet covers, place mats, napkins, window screens, etc.); clothing (e.g., hats, gloves, socks, shirts, pants, shorts, dresses, sweaters, jackets, etc.); a bag (e.g., a purse, a backpack, grocery bad, etc.); bicycle, stroller, child's toy, farming equipment; or the exterior or interior of a vehicle (e.g., the exterior or interior of the body, the wheels, the exterior or interior of the window, any interior surface of the car, or the exterior or interior lights. The term "surface" also includes the surface that is inside or outside of a trap, such as an insect trap (e.g., a bait trap). A bait trap can contain additional components, e.g., attractants, such as sugar.

In certain embodiments, the surface is the outer layer, e.g., skin, of a subject. For example, a compound described herein can be applied directly to the skin of a subject that would be exposed to a mosquito. As used herein, a "subject" means a human or animal. Usually the animal is a vertebrate such as a primate, rodent, domestic animal or game animal. Primates include, for example, chimpanzees, cynomolgous monkeys, spider monkeys, and macaques, e.g., Rhesus. Rodents include, for example, mice, rats, woodchucks, ferrets, rabbits and hamsters. Domestic and game animals include, for example, cows, horses, pigs, deer, bison, buffalo, feline species, e.g., domestic cat, canine species, e.g., dog, fox, wolf, avian species, e.g., chicken, emu, ostrich, and fish, e.g., trout, catfish and salmon. In some embodiments, the subject is a mammal, e.g., a primate, e.g., a human. Preferably, the subject is a mammal. The mammal can be a human, non-human primate, mouse, rat, dog, cat, horse, or cow, but is not limited to these examples.

In some embodiments, the surface comprises the compositions described herein that can comprise, among other things, carriers (e.g., organic solvents, such as alkanols, such as ethanol; aromatics, such as xylenes; ketones, such as acetone; plant-derived oils, such as those derived from corncobs; and petroleum fractions), emulsifiers, stabilizers, cuticular/tarsal uptake enhancers, and cytochrome P450 inhibitors (e.g., piperonyl butoxide, 1-aminobenzotriazole, alpha-naphthoflavone, beta-naphthoflavone, apigenin, baicalein, beta-myrcene, catechin, 3-phenylpropyl acetate, formononetin, gallic acid, hesperetin, hesperidin, isoquercitrin, lauryl alcohol, luteolin, luteolin-7-glycoside, narigin, nordihydroguaiaretic acid, quercitrin, swertiamarin, terpineol, and trans-cinnamaldehyde).

In one embodiment, the surface is coated (e.g., the composition is applied to the surface) with the composition described herein once. In another embodiment, the surface is coated with the composition at least 2 times during a given period of time. For example, a surface can be coated at least 1, 2, 3, 4, 5, 6, 7, 8, 9, 10, or more times within one day. A surface can be coated at least 1, 2, 3, 4, 5, 6, 7, 8, 9, 10, or more times within one week. A surface can be coated at least 1, 2, 3, 4, 5, 6, 7, 8, 9, 10, or more times within one month. A surface can be coated at least 1, 2, 3, 4, 5, 6, 7, 8, 9, 10, or more times within one year. A surface can be coated at least 1, 2, 3, 4, 5, 6, 7, 8, 9, 10, or more times within 5 years. A surface can be coated at least 1, 2, 3, 4, 5, 6, 7, 8, 9, 10, or more times within one decade or more. In one embodiment, subsequent coatings of the surface are done at the same concentration as the prior coating. In alternative embodiments, subsequent coatings of the surface can be done at higher or lesser concentrations that then prior coating. For example, the at least a second coating can be done at a concentration that is 50% higher than the first coating, or the at least a second coating can be done at a concentration that is 50% lower than the first coating.

In one embodiment, the compound is applied (e.g., coated) to the surface continuously (e.g., at constant levels over a period of time). Continuous application of a composition described herein can be achieved, e.g., aerosol application, or automated application systems, for example a sprinkler that delivers the composition to a desired surface.

All patents, patent applications, and publications identified are expressly incorporated herein by reference for the purpose of describing and disclosing, for example, the methodologies described in such publications that might be used in connection with the present invention. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to the applicants and does not constitute any admission as to the correctness of the dates or contents of these documents.

One aspect provided herein provide a method comprising applying a composition comprising at least one *Plasmodium* transmission blocking compounds to a surface.

The present invention can be further described in any of the following numbered paragraphs:

1. A method for reducing transmission of *Plasmodium* to a female mosquito, the method comprising: contacting a female mosquito with a composition comprising an effective amount at least one *Plasmodium* transmission blocking compound.
2. The method of paragraph 1, wherein the at least one *Plasmodium* transmission blocking compound is an anti-malaria compound.
3. The method of any preceding paragraph, wherein the at least one *Plasmodium* transmission blocking compound is an insecticide.
4. The method of any preceding paragraph, wherein the at least one *Plasmodium* transmission blocking compound is a mitochondria electron transport chain inhibitor (mtETC).
5. The method of any preceding paragraph, wherein the at least one mtETC inhibitor is selected from the group consisting of: Amytal, Rotenone, Antimycin A, carbon monoxide (CO), Sodium Azide, and Cyanide.
6. The method of any preceding paragraph, wherein the Antimycin A inhibitor is a cytochrome B inhibitor.
7. The method of any preceding paragraph, wherein the cytochrome B inhibitor is selected from the group consisting of: ELQ300, Menoctone, MMV665827, MMV006913, MMV666081, MMV666095, Fluacrypyrim, Bifenazate, Atovaquone ATQ, Hydramethylnon (HYD), or acaricide acequinocyl (ACE).
8. The method of any preceding paragraph, wherein the cytochrome B inhibitor is Atovaquone ATQ, Hydramethylnon (HYD), or acaricide acequinocyl (ACE).
9. The method of any preceding paragraph, wherein the contacting comprises topical contacting.
10. The method of any preceding paragraph, wherein the topical contacting comprises tarsal contact.
11. The method of any preceding paragraph, wherein the tarsal contact comprises tarsal absorption of the at least one *Plasmodium* transmission blocking compound.
12. The method of any preceding paragraph, wherein the contacting occurs on a surface coated with the at least one *Plasmodium* transmission blocking compound.
13. The method of any preceding paragraph, wherein the surface is selected from the group consisting of: an interior wall of a building; an exterior wall of a building; a bed net; an indoor fabric; an outdoor fabric; clothing; inside a trap; and outside a trap.
14. The method of any preceding paragraph, wherein the trap is a bait trap.
15. The method of any preceding paragraph, wherein the female mosquitoes comprise *Anopheles* spp., *Aedes* spp., or *Culex* spp.
16. The method of any preceding paragraph, wherein the female mosquito is an adult female mosquito.
17. The method of any preceding paragraph, wherein reducing transmission inhibits the zygote/ookinete transition of *Plasmodium* development.
18. The method of any preceding paragraph, wherein reducing transmission results in the inhibition of *Plasmodium* ookinete development.
19. The method of any preceding paragraph, wherein the female mosquito has not been infected with *Plasmodium* prior to contacting.
20. The method of any preceding paragraph, wherein the female mosquito has been infected with *Plasmodium* prior to contacting.
21. The method of any preceding paragraph, wherein the composition further comprises at least one of a cuticular/tarsal uptake enhancer and a cytochrome P450 inhibitor 22. The method of any preceding paragraph, wherein the cuticular/tarsal uptake enhancer comprises a mixture of the methyl esters of saturated and unsaturated C10-C26 fatty acids.

23. The method of any preceding paragraph, wherein the cuticular/tarsal uptake enhancer comprises rapeseed methyl ester.
24. The method of any preceding paragraph, wherein the cytochrome p450 inhibitor is at least one of piperonyl butoxide and 1-aminobenzotriazole.
25. A surface comprising an effective amount of at least one *Plasmodium* transmission blocking compound.
26. The surface of claim 25, wherein the at least one *Plasmodium* transmission blocking compound is an anti-malaria compound.
27. The surface of any preceding paragraph, wherein the at least one *Plasmodium* transmission blocking compound is an insecticide.
28. The surface of any preceding paragraph, wherein the at least one *Plasmodium* transmission blocking compound is a mitochondria electron transport chain inhibitor.
29. The surface of any preceding paragraph, wherein the at least one mtETC inhibitor is selected from the group consisting of: Amytal, Rotenone, Antimycin A, carbon monoxide (CO), Sodium Azide, and Cyanide.
30. The surface of any preceding paragraph, wherein the Antimycin A inhibitor is a cytochrome B inhibitor.
31. The surface of any preceding paragraph, wherein the cytochrome B inhibitor is selected from the group consisting of: ELQ300, Menoctone, MMV665827, MMV006913, MMV666081, MMV666095, Fluacrypyrim, Bifenazate, Atovaquone ATQ, Hydramethylnon (HYD), or acaricide acequinocyl (ACE).
32. The surface of any preceding paragraph, wherein the cytochrome B inhibitor is Atovaquone ATQ, Hydramethylnon (HYD), or acaricide acequinocyl (ACE).
33. The surface of claim 25, wherein the surface is selected from the group consisting of: an interior wall of a building; an exterior wall of a building; a bed net; an indoor fabric; an outdoor fabric; clothing; inside a trap; and outside a trap.
34. The surface of any preceding paragraph, wherein the trap is a bait trap.
35. The surface of any preceding paragraph, wherein the composition is present on the surface at a concentration of 10 µmol/m$^2$-1 mmol/m$^2$.
36. The surface of any preceding paragraph, wherein the surface further comprises at least one of a cuticular/tarsal uptake enhancer and a cytochrome P450 inhibitor.
37. The surface of any preceding paragraph, wherein the cuticular/tarsal uptake enhancer comprises a mixture of methyl esters of saturated and unsaturated C10-C26 fatty acids.
38. The surface of any preceding paragraph 6, wherein the cuticular/tarsal uptake enhancer comprises rapeseed methyl ester.
39. The surface of any preceding paragraph, wherein the cytochrome P450 inhibitor is at least one of piperonyl butoxide and 1-aminobenzotriazole.
40. A method comprising applying a composition comprising an effective amount of at least one *Plasmodium* transmission blocking compound to a surface.
41. The method of claim 40, wherein the surface is selected from the group consisting of: an interior wall of a building; an exterior wall of a building; a bed net; an indoor fabric; an outdoor fabric; clothing; inside a trap; and outside a trap.
42. The method of any preceding paragraph, wherein the trap is a bait trap.
43. The method of any preceding paragraph, wherein the composition is present on the surface at a concentration of 10 µmol/m$^2$-1 mmol/m$^2$.

EXAMPLES

Example 1

Significant strides have been made in malaria control since the introduction of insecticide-based strategies targeting the *Anopheles* mosquito species that transmit *Plasmodium* parasites. Long-lasting insecticide treated bed nets (LLINs) alone are predicted to be responsible for 68% of all malaria cases averted since the beginning of this century, and together with indoor residual insecticide spraying (IRS) of house walls represent a cornerstone of malaria control efforts (1). The widespread use of these strategies has, however, caused an alarming spread of resistance to insecticides in all major *Anopheles* populations in malaria-endemic countries (2-5). Containment and management of insecticide resistance has been undermined by the lack of approved active ingredients for LLINs, which, until recently (6-8), were limited to pyrethroids, typically permethrin or deltamethrin. Although the global health consequences of widespread insecticide resistance are still unknown, it is likely that reduced efficacy of LLINs and IRS will lead to resurgence of malaria across its range. Indeed, after a period of steady decline in annual clinical cases (9), sub-Saharan Africa and other geographies have experienced a plateau or even an increase in malaria incidence (10), raising considerable concern. As many countries move towards a focus on not just malaria control but elimination, it is imperative that more and improved tools to stop parasite transmission by the *Anopheles* mosquito are generated.

Figure 1B:
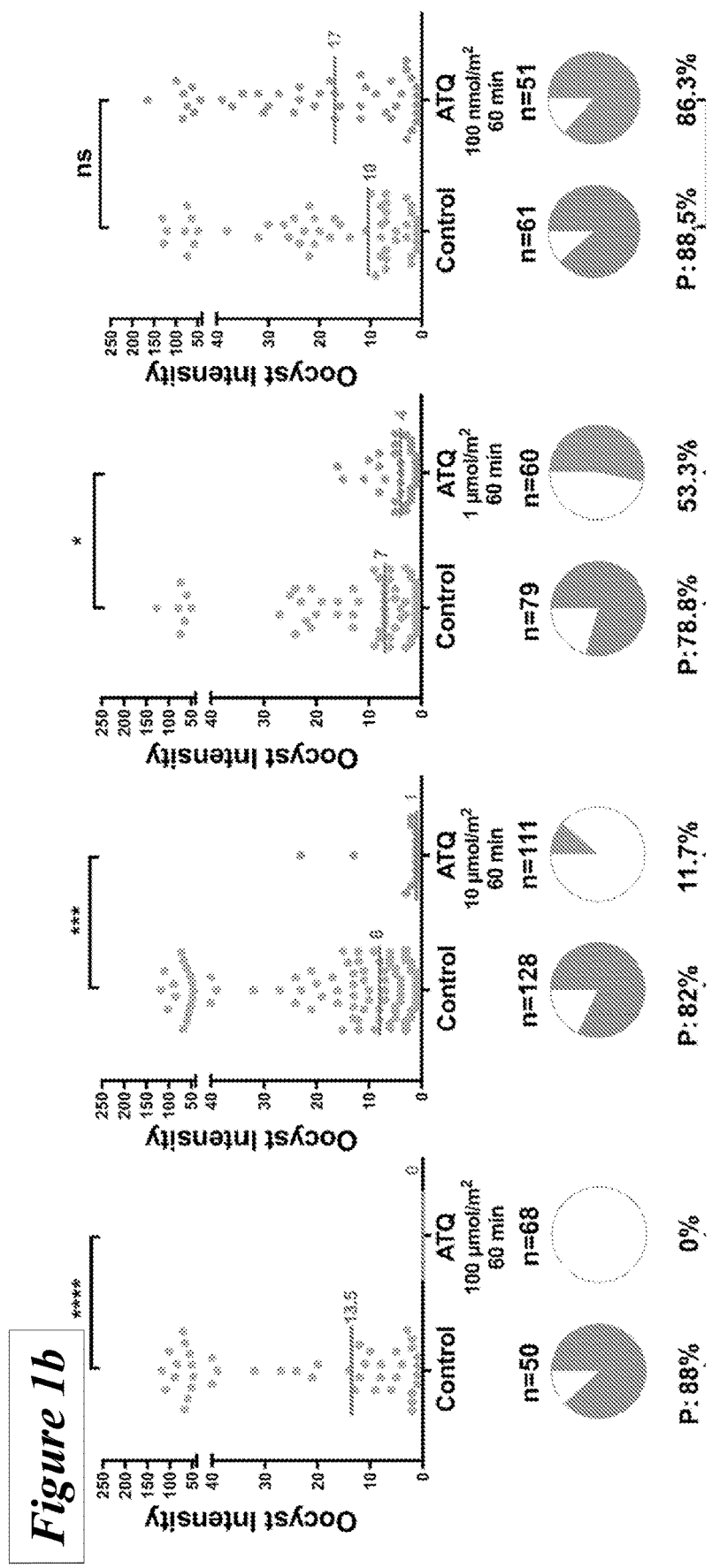
Figure 1C:
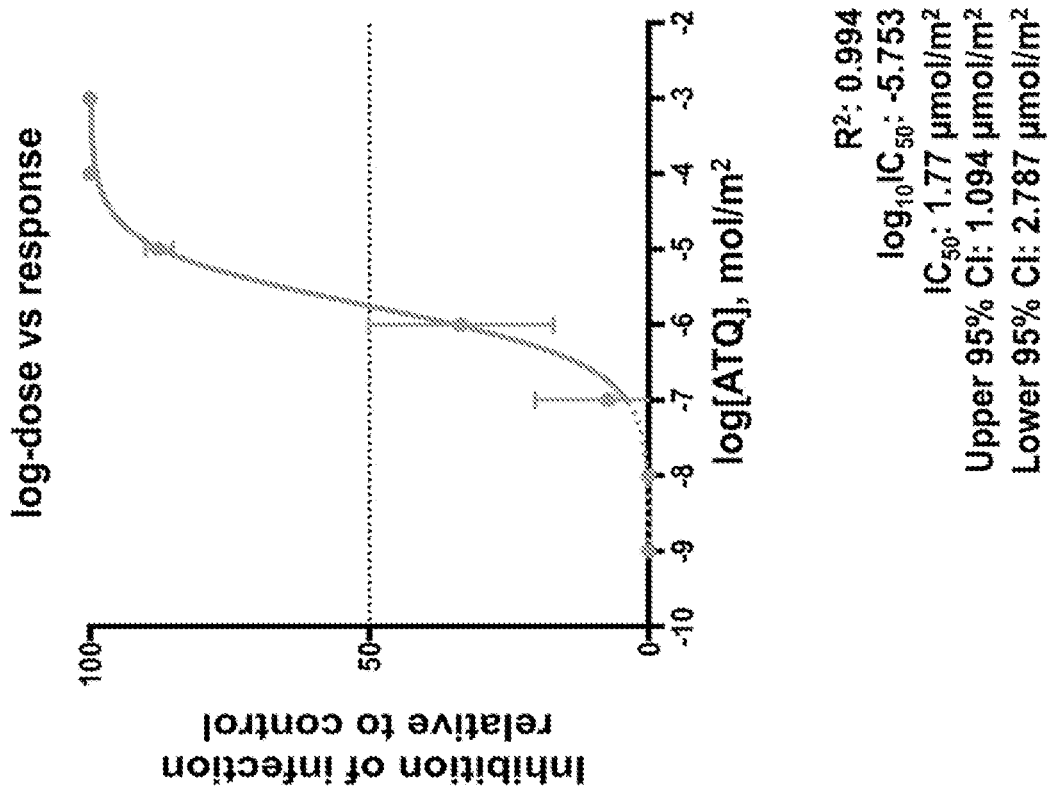

Besides LLINs and IRS, malaria control strategies heavily rely on drugs to cure *Plasmodium* infections in humans, the current gold standard treatment being the use of artemisinin-based combination therapy (ACT) (1). It was reasoned that it may be possible to use antimalarial compounds to also clear *Plasmodium* infections directly in the *Anopheles* mosquito, employing delivery methods equivalent to mosquito contact with insecticides on a bed net or wall. This rationale exploits the complex *P. falciparum* life cycle in which the mosquito stages represent a significant bottleneck to transmission, as generally fewer than 100 ookinetes cross the midgut epithelium to form oocysts. To this aim, a glass substrate was coated with the potent parasite cytochrome B inhibitor atovaquone (ATQ) and allowed *An. gambiae* females to rest on this surface immediately prior to *P. falciparum* infection. This tarsal exposure (i.e. via the mosquito legs) is based on a modified WHO insecticide assay (11) which simulates how mosquitoes uptake insecticides on LLINs and IRS. Due to its highly lipophilic nature, it was hypothesized that ATQ would be capable of traversing the insect cuticle, killing the parasite during sporogony. Strikingly, *P. falciparum* development was completely abrogated in females exposed to ATQ. No oocysts were detected in ATQ-treated females (1 mmol/m$^2$ for 60 minutes), while control, mock-exposed individuals showed high infection prevalence and intensity (FIG. 1a). To characterize the protective effect of ATQ, a tenfold dilution series of exposures was performed. Across multiple replicates, complete blockade of *P. falciparum* development was observed using a tenfold lower ATQ concentration (100 µmol/m$^2$), while at as low as 10 µmol/m$^2$ significant inhibition of prevalence (87.6% inhibition) and intensity (87.5% inhibition) of infection was still found compared to controls (FIG. 1b). Further ATQ dilutions had a progressively reduced, dose-dependent inhibitory effect (FIG. 1b). By interpolating these data onto a dose-response curve the $IC_{50}$ of ATQ exposure was calculated as a surface concentration of 1.77 µmol/m² (FIG. 1c). This is comparable to the $LC_{50}$ of the potent neurotoxic LLIN insecticide permethrin in susceptible An. gambiae mosquitoes (63 µmol/m² for a 60-minute tarsal exposure (12)).

Figure 2A:
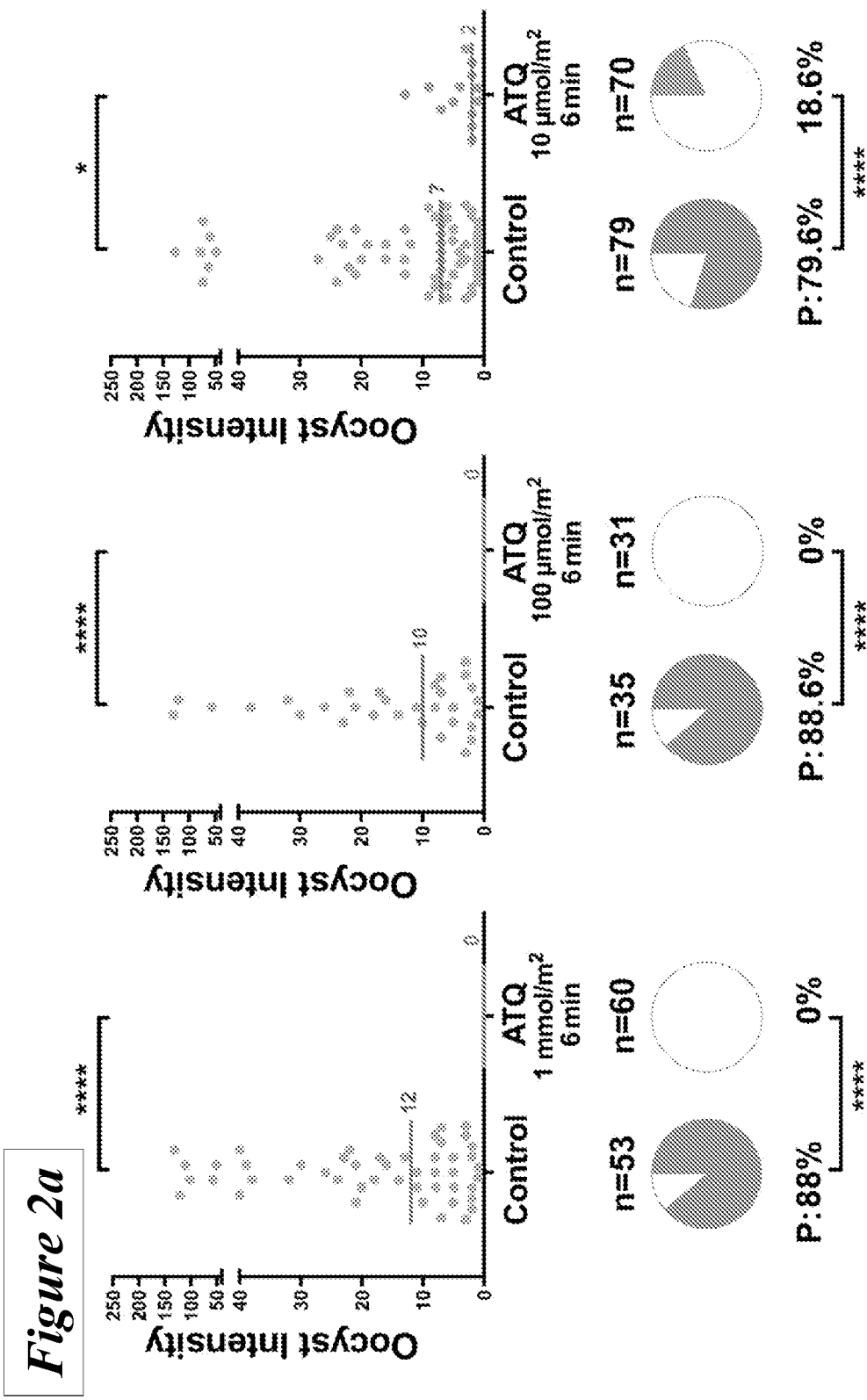
FIGS. 2a-2b show transmission blocking activity of ATQ is maintained at shorter exposure times.
Figure 2B:
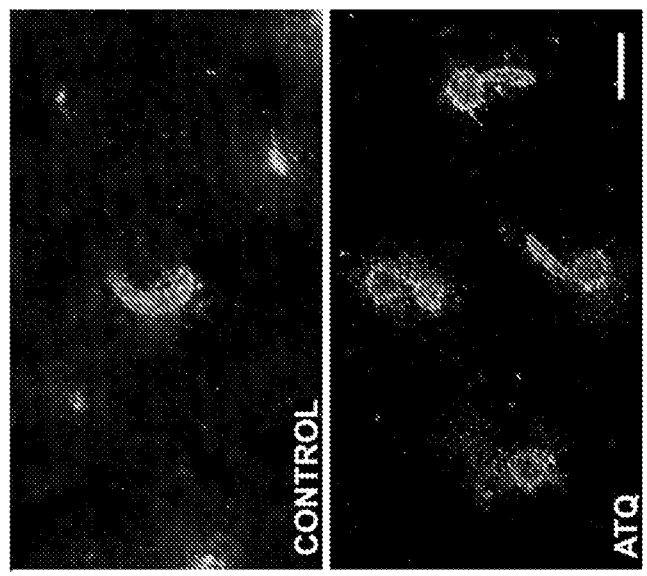
Figure 5B:
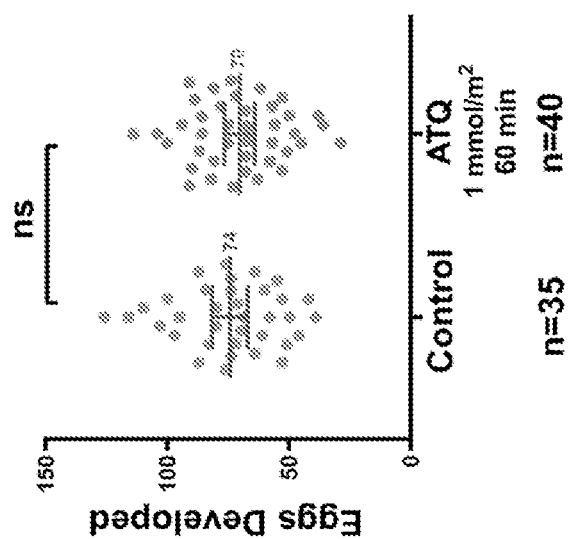
FIGS. 5a-5b show effects of ATQ exposure on survival and post blood-feeding egg production in *An. gambiae* females.
Figure 5A:
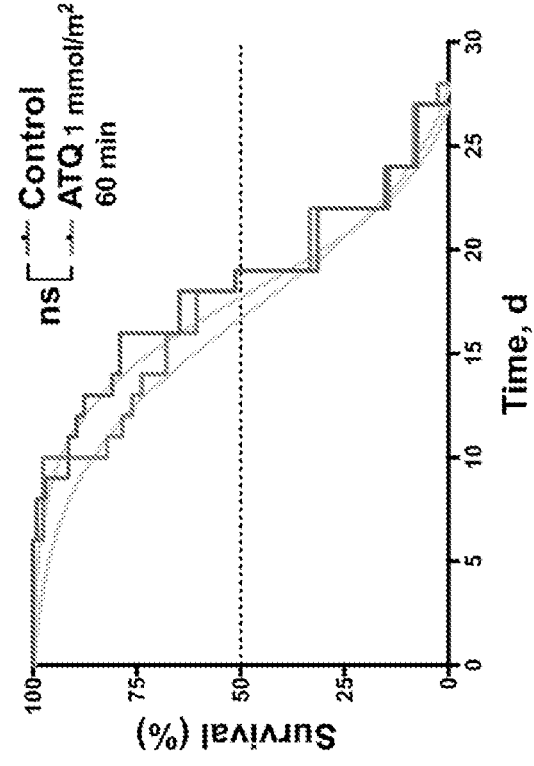

Importantly, killing of P. falciparum parasites was completely effective when exposure time was reduced tenfold to 6 minutes (FIG. 2a), indicating that transmission-blocking doses of ATQ are taken up across the insect cuticle within a short timeframe that is within reported contact times for host-seeking mosquitoes on LLINs (13). Indeed, parasites were killed at the early zygote-ookinete transition, as determined by immunofluorescent assays (IFAs) of infected midguts. While zygotes and retort forms were observed, no ookinetes were detected in the ATQ-treated females indicating parasite arrest (FIG. 2b). These data are consistent with previous studies showing that ookinetes are arrested when mosquitoes feed on P. berghei-infected mice injected with ATQ (14) or when parasites are cultured in vitro in the presence of this antimalarial (15). ATQ exposure had no fitness costs to the mosquito in terms of survival and reproductive output (FIG. 5a-5b).

Figure 3:
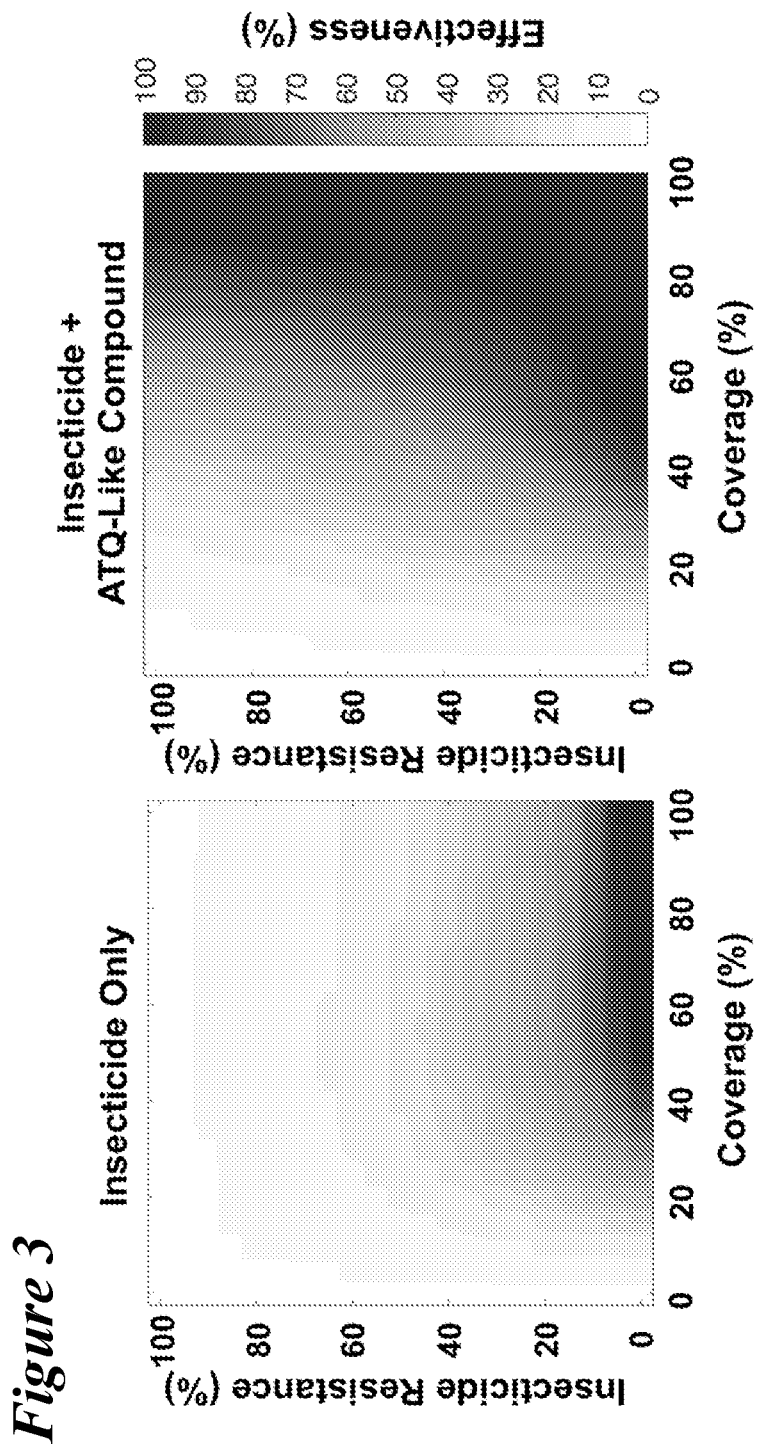
FIG. 3 shows malaria transmission model predicting the effects of adding ATQ to LLIN interventions in moderate (45% human infection prevalence) malaria transmission settings. Heat maps of changes in malaria transmission for LLIN-like interventions using insecticide alone or insecticide plus an ATQ-like compound, relative to no intervention at varying coverage and varying insecticide efficacy. The "effectiveness" of the interventions is defined as (1−proportion reduction in malaria transmission relative to no intervention) and is represented as colors ranging from yellow (no change in malaria transmission) to dark blue (elimination of malaria transmission) at varying levels of coverage (x-axis) and insecticide resistance (y-axis). Insecticide resistance is the percent of mosquitoes that are impervious to insecticide; coverage is the probability of a mosquito encountering an intervention during a single feeding episode. The model output demonstrates that addition of ATQ significantly increases the ability of an LLIN-like intervention to reduce and even eliminate malaria transmission.
Figure 6A:
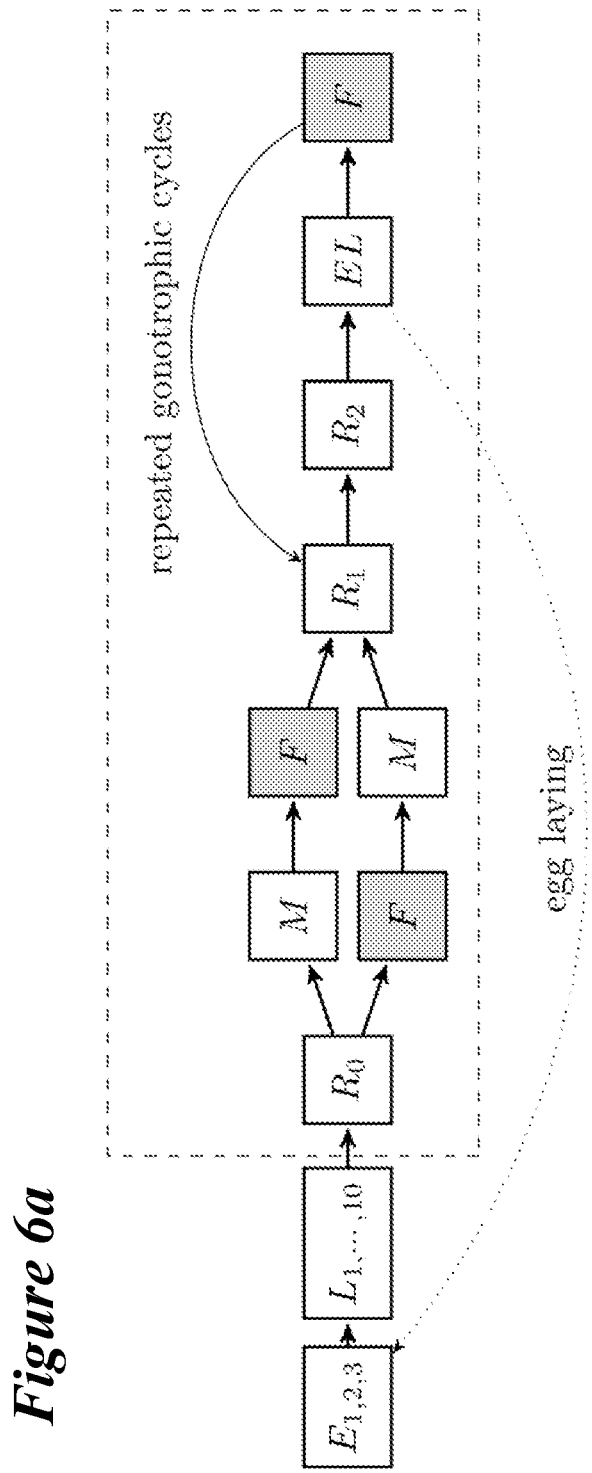
FIGS. 6a-6c show model for Structure and Population Parameters.
Figure 6B:
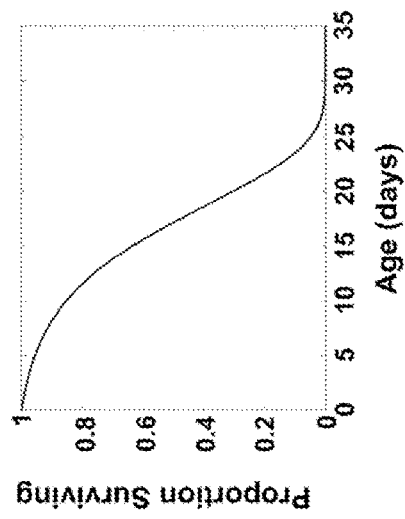
Figure 6C:
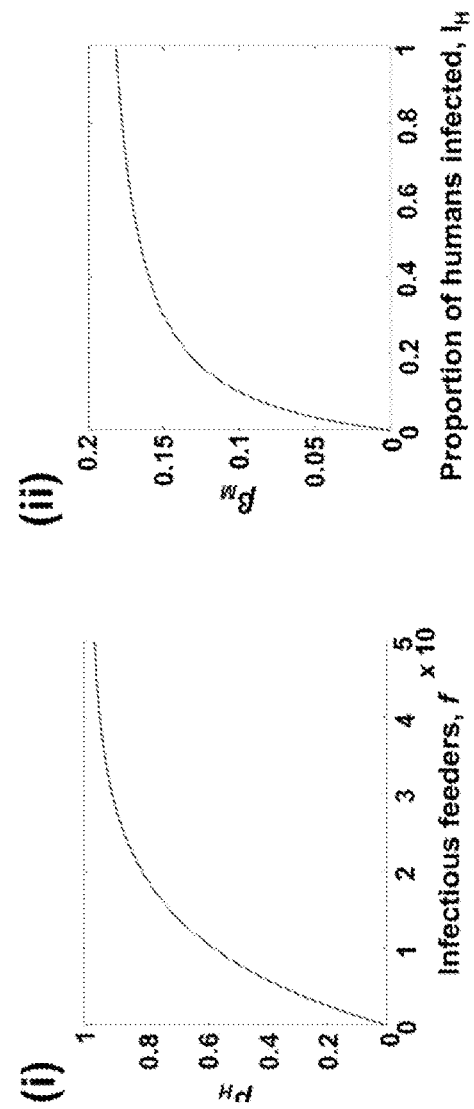

These results were next incorporated into a mathematical model of malaria transmission that includes mosquito population dynamics and human malaria infection (16, FIG. 6a-6c). The effects of the introduction of either conventional LLINs, or nets combining insecticides with a compound that has ATQ-like properties, were modeled on population scale malaria transmission at varying intervention coverage (0-100%) and variable levels of insecticide resistance (0-100%) in the vector population (2, 4). It assumed 100% blockade of new Plasmodium infections on the same day of exposure to the antimalarial compound, and no effects on ongoing Plasmodium infections. The model presented herein predicts that ATQ-like compounds would considerably enhance the effectiveness of insecticide-treated nets, particularly at high coverage and, importantly, high levels of insecticide resistance (FIG. 3). When transmission outcomes were plotted for all combinations of coverage and insecticide resistance, the addition of an anti-Plasmodium compound significantly increased the effectiveness of the control intervention, facilitating malaria suppression (FIG. 3). Based on these predictions, incorporation of a compound with Plasmodium transmission-blocking activity would significantly expand the lifespan of insecticide-based strategies, a factor particularly important in transmission hot spots where resistance to pyrethroids is nearly total (2).

Figure 4:
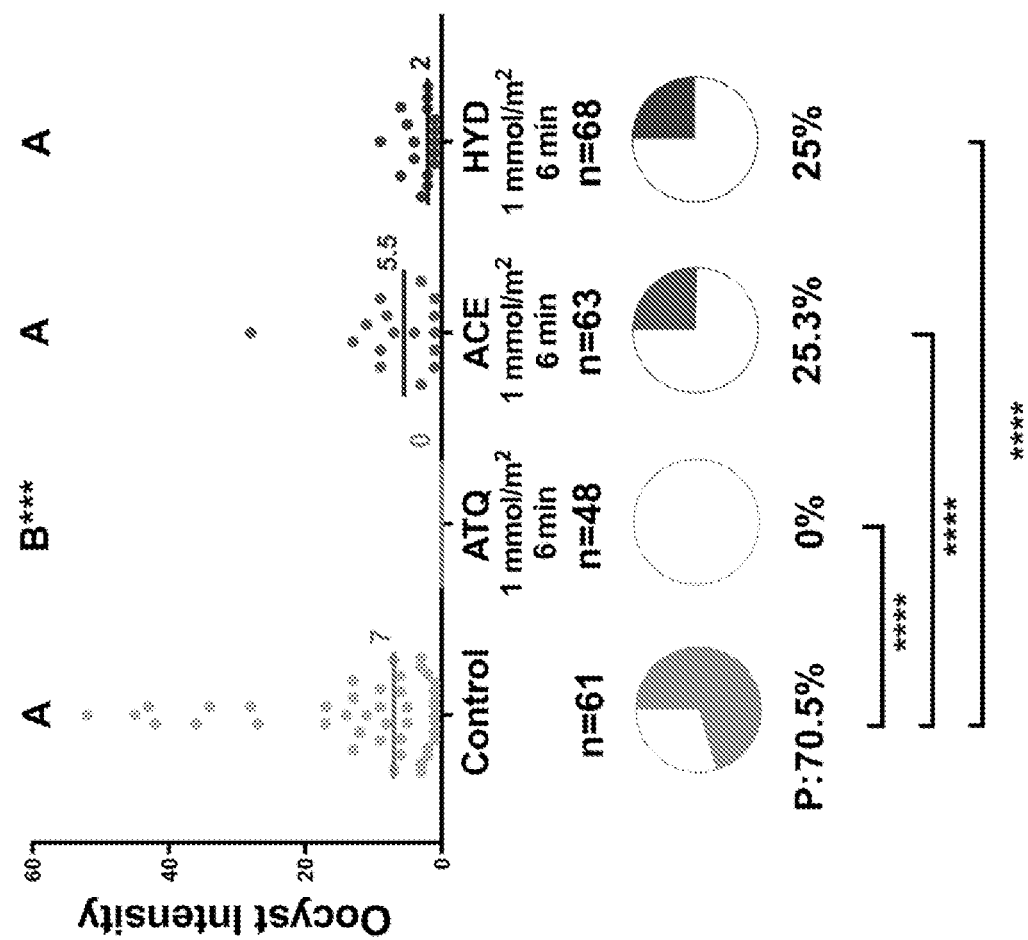
FIG. 4 shows other cytochrome B inhibitors have *P. falciparum* transmission-blocking activity. *An. gambiae* females exposed to 1 mmol/m2 of the arthropod cytochrome B inhibitors acequinocyl (ACE) and hydramethylnon (HYD), as well as ATQ, for 6 minutes show strongly reduced prevalence (pie charts) of *P. falciparum* relative to controls (Pairwise Chi2 with Bonferroni correction, df=1, p<0.0001 in both cases). With the exception of ATQ, there was no difference between treatments on the median intensity of infection. Letters indicate groups that are statistically different from one another (Wilcoxon with Dunn's post hoc, df=3). Where relevant statistical significance is indicated as so: ns=not significant, * p<0.05,  p<0.01, * p<0.001, **** p<0.0001. Whenever relevant, n indicates the sample size.
Figure 7:
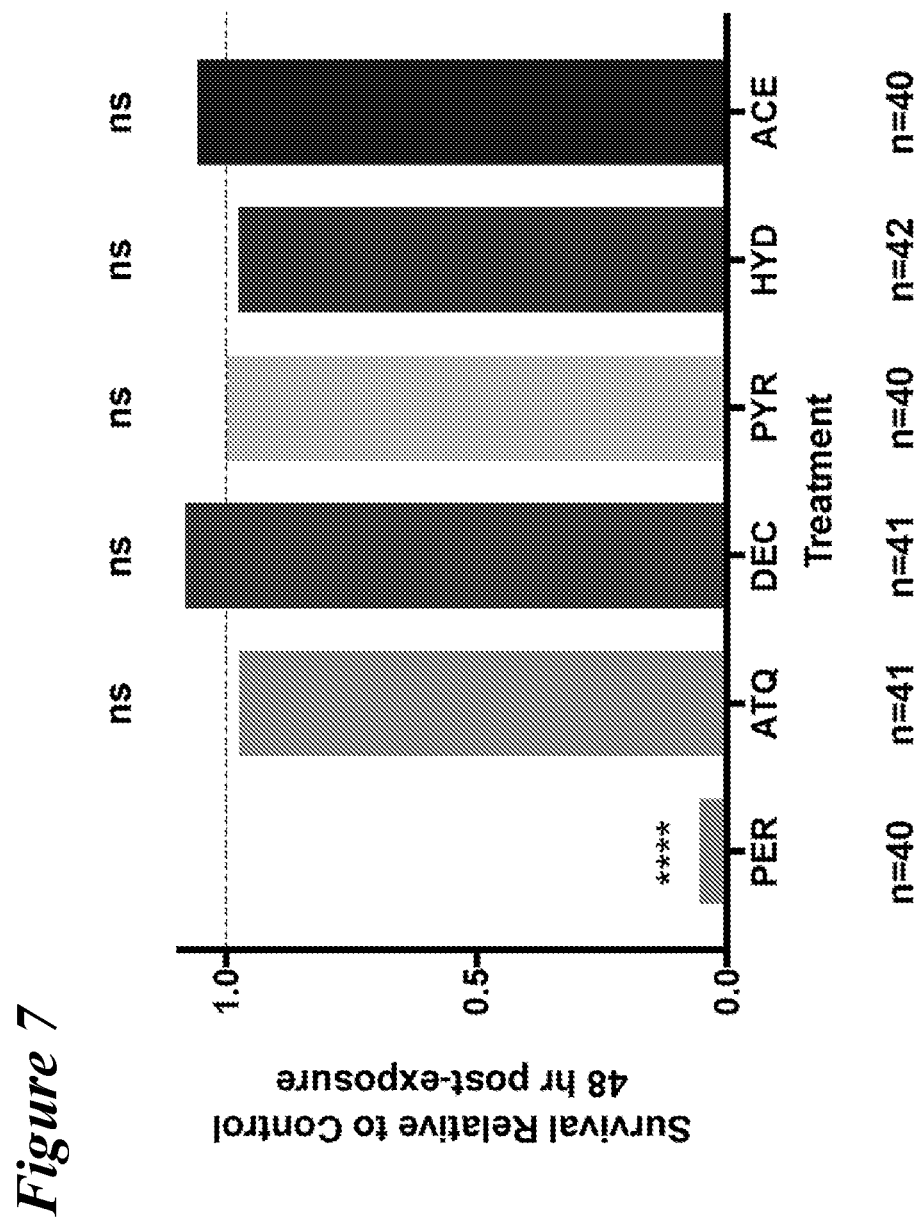
FIG. 7 shows mosquito survival relative to an untreated control after 48 h following exposure to ATQ, DEC, PYR, HYD, ACE and permethrin (PER). The proportion of female *An. gambiae* surviving exposure to each compound (1 mmol/m2, 60 minutes) relative to the proportion of female *An. gambiae* surviving exposure to an untreated control is shown. Permethrin exposure causes almost complete mortality (proportionate survival relative to controls=0.055) while ATQ (0.975), DEC (1.084), PYR (1.000), HYD (0.976) and ACE (1.059) all survived comparably to their controls. Significant differences in survival between each treatment and its control was determined with a Chi2 test corrected for multiple comparisons. Where relevant statistical significance is indicated as so: ns=not significant, * $p<0.05$,  $p<0.01$, * $p<0.001$, **** $p<0.0001$. Whenever relevant, n indicates the sample size.
Figure 8:
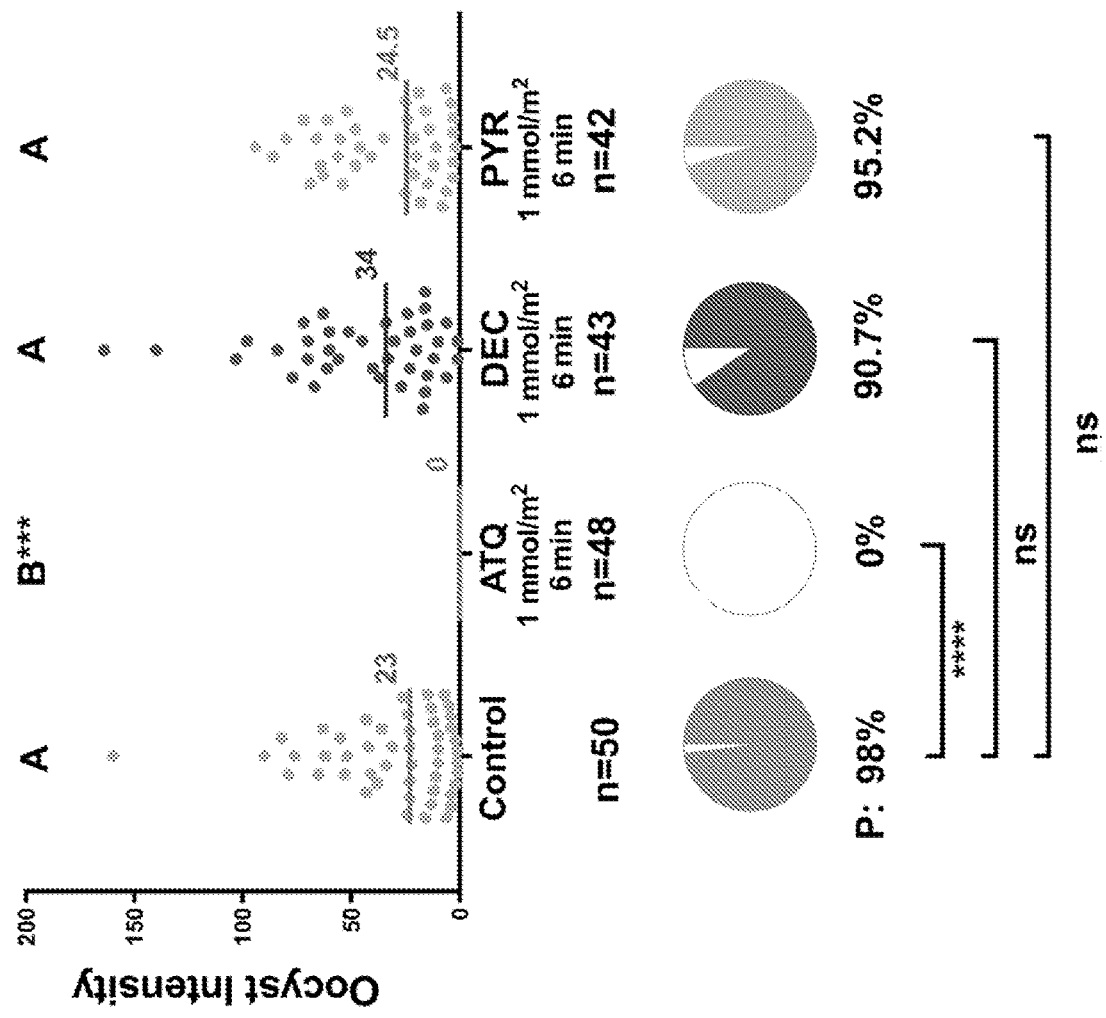
FIG. 8 shows testing additional compounds for transmission blocking activity through tarsal contact. Mosquitoes were exposed to 1 mmol/m2 PYR or DEC for 6 minutes. Neither compound is capable of reducing the prevalence *P. falciparum* through tarsal contact, relative to controls (Pairwise Chi2 with Binferroni correction, df=1, p>0.05 for both DEC and PYR). With the exception of ATQ, there is no difference between treatments on the median intensity of infection. Letters indicate groups that are statistically different from one another (Wilcoxon with Dunn's post hoc, df=3). Where relevant statistical significance is indicated as so: ns=not significant, * $p<0.05$,  $p<0.01$, * $p<0.001$, **** $p<0.0001$. Whenever relevant, n indicates the sample size.
Figure 9A:
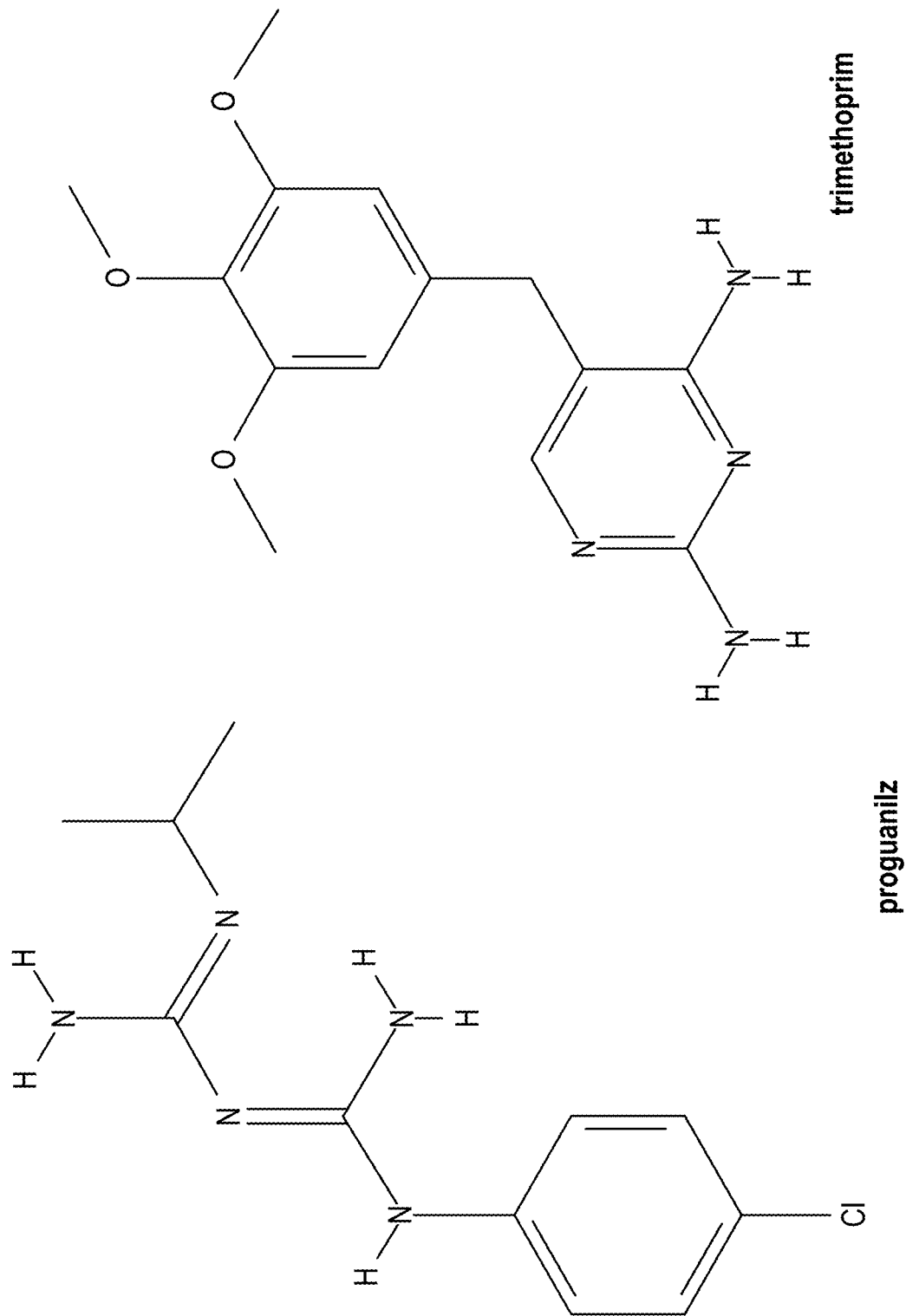
FIGS. 9A-9P lists the chemical structures for the transmission blocking compounds listed in Table 1.
Figure 9B:
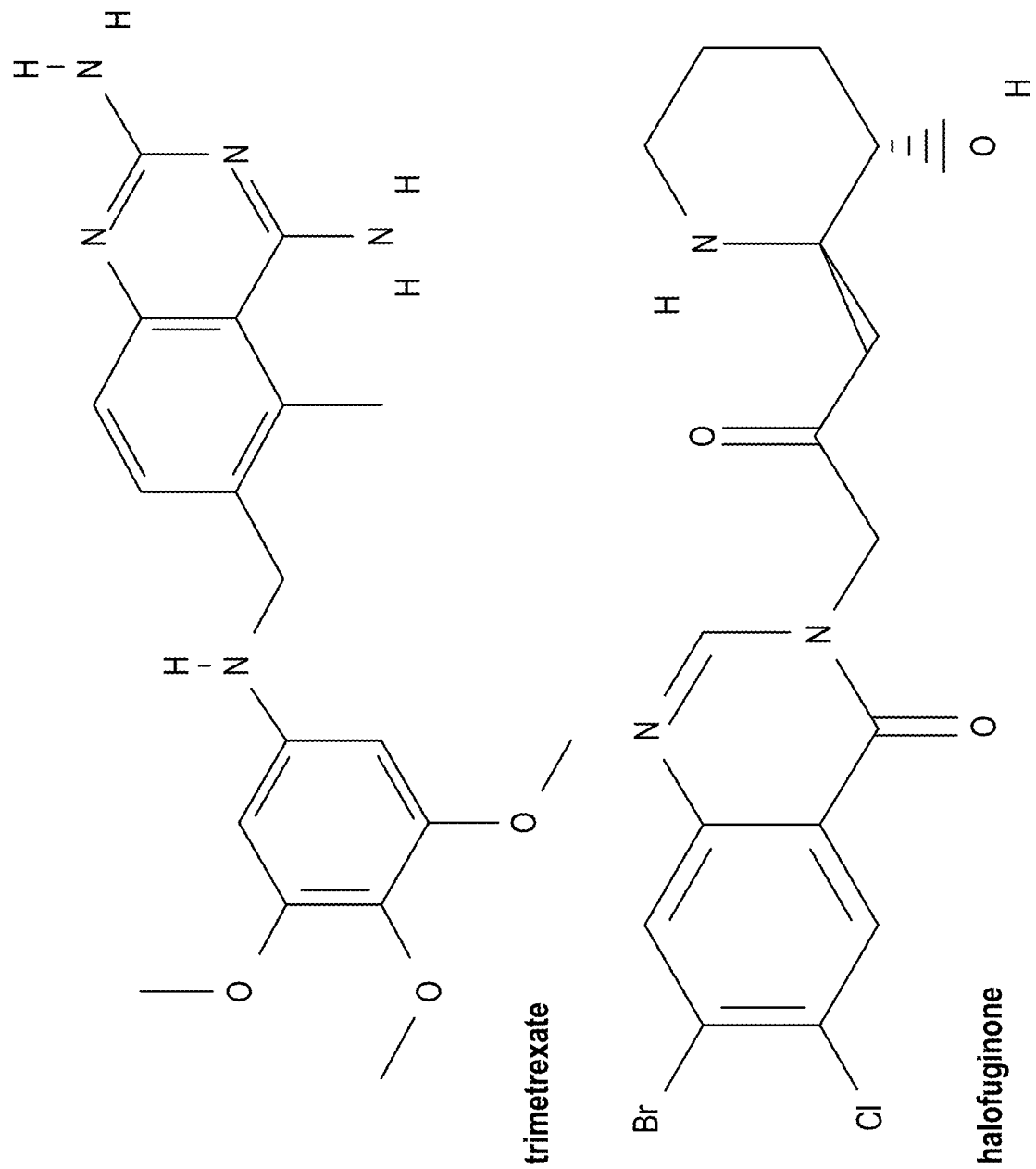
Figure 9C:
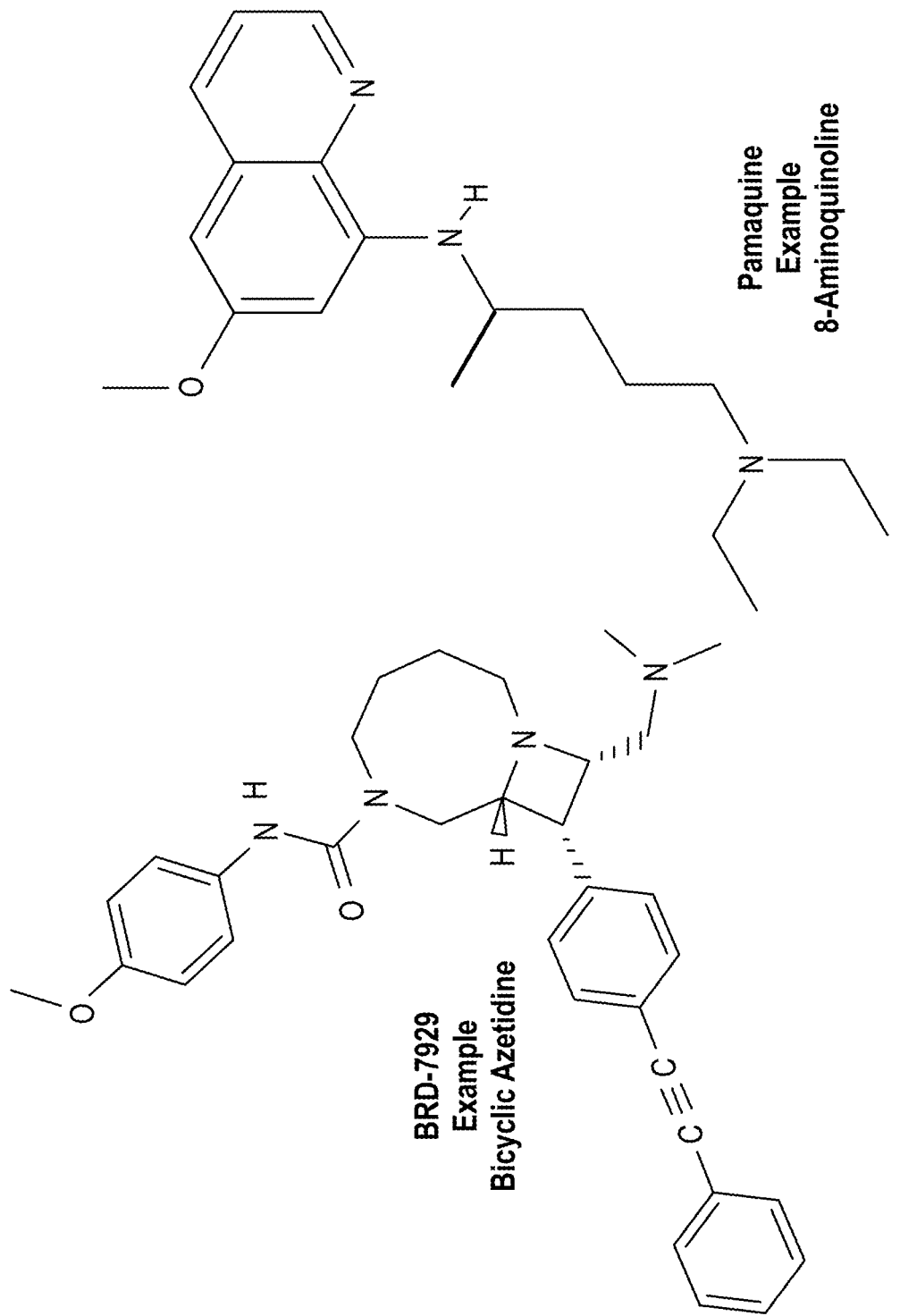
Figure 9D:
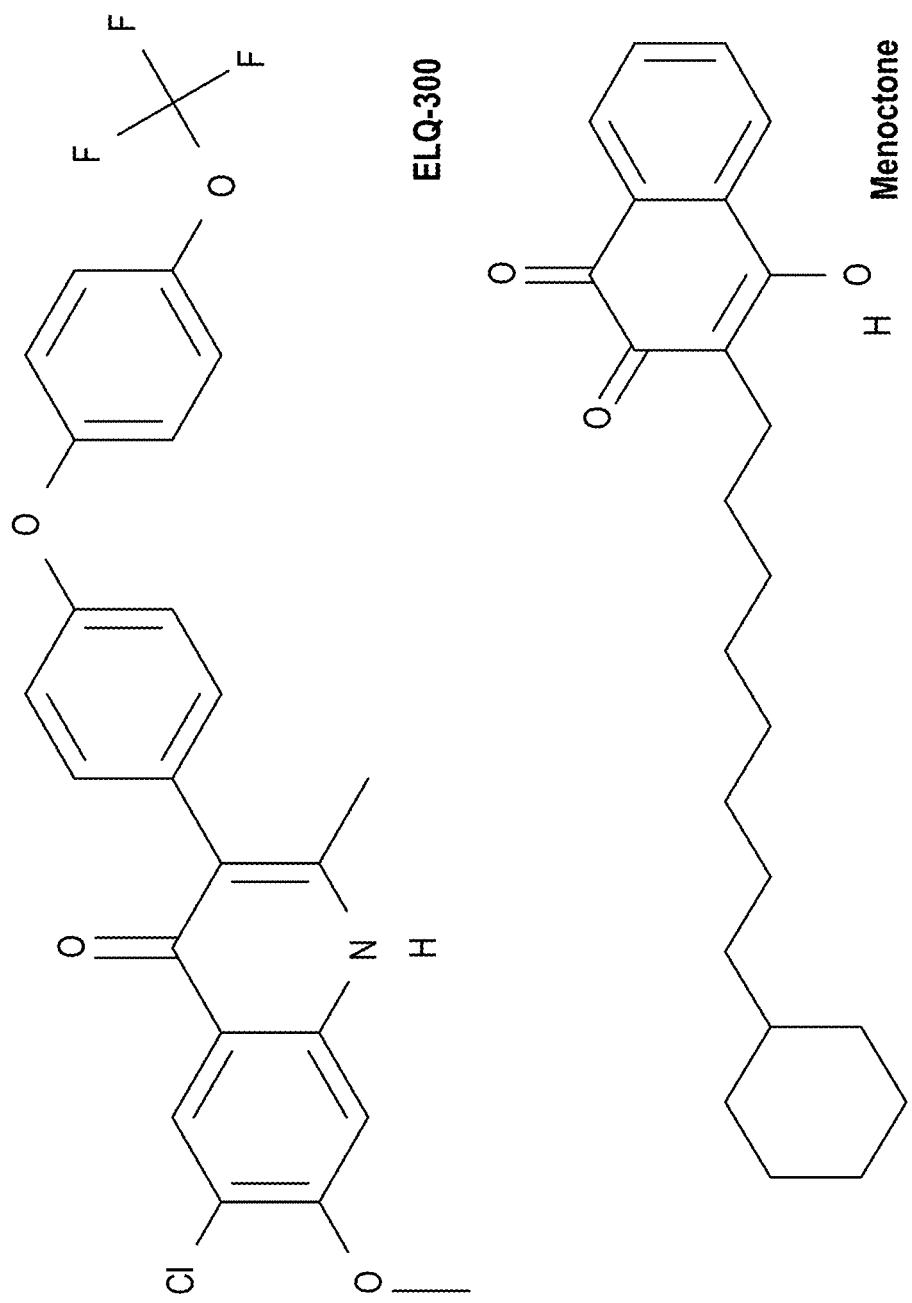
Figure 9E:
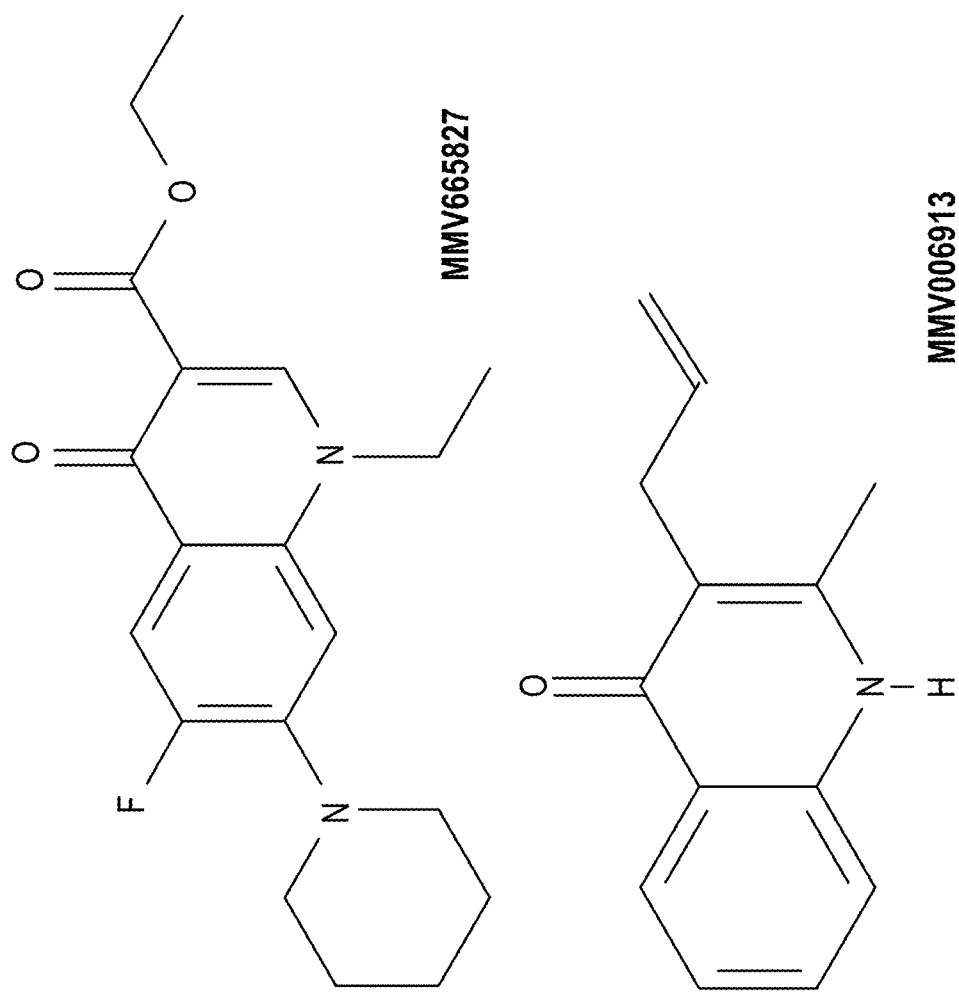
Figure 9F:
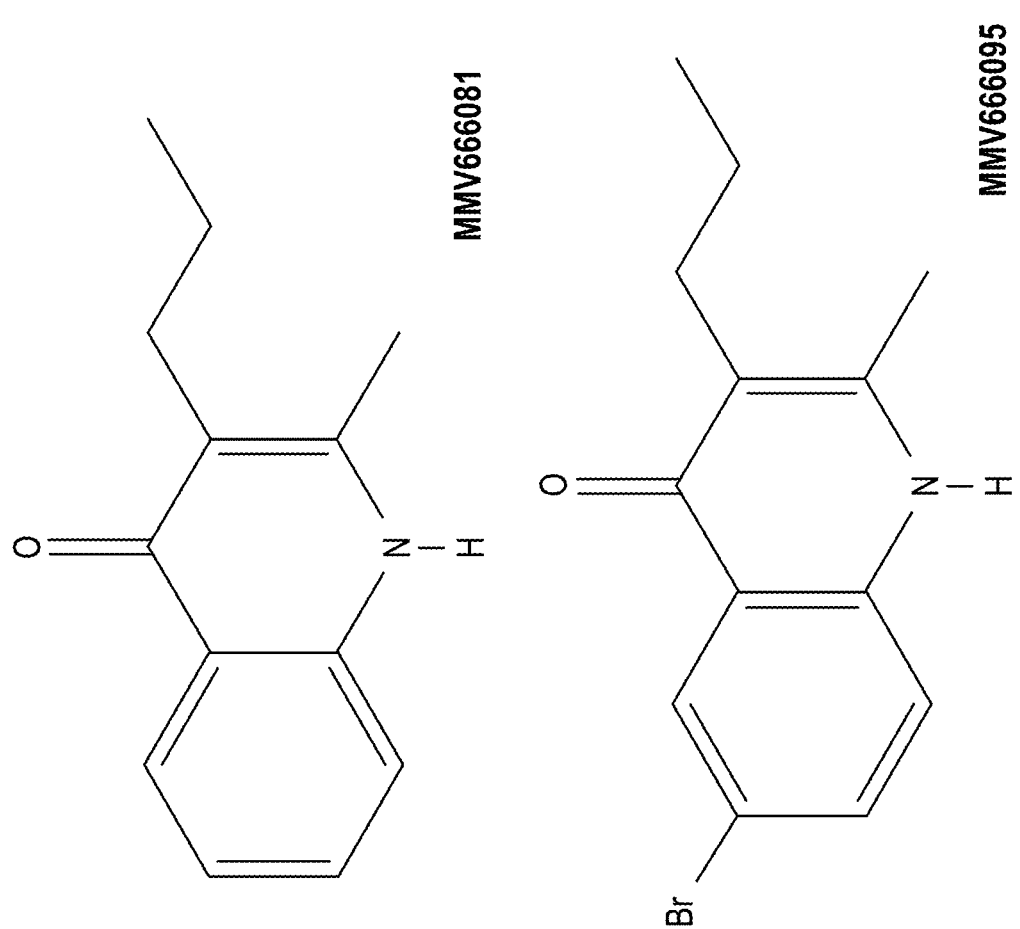
Figure 9G:
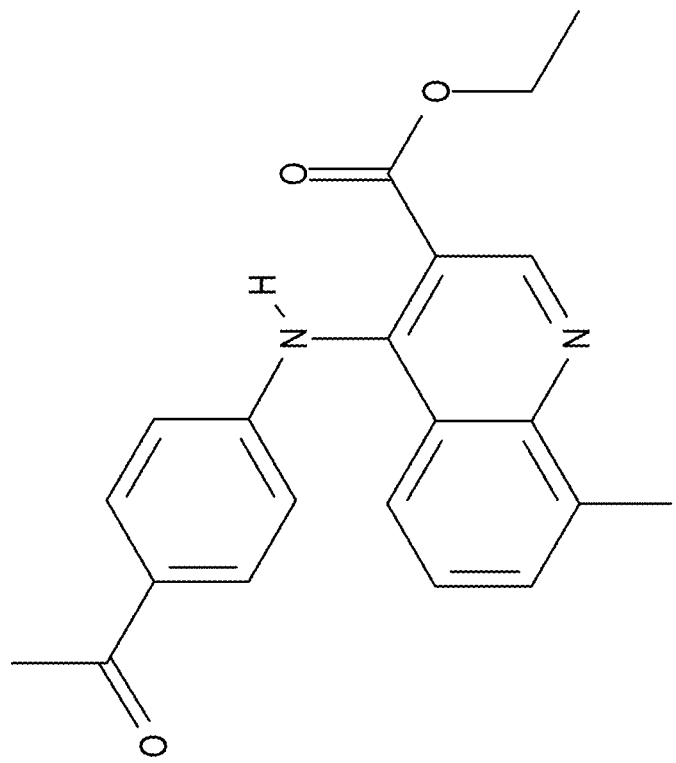
Figure 9G:
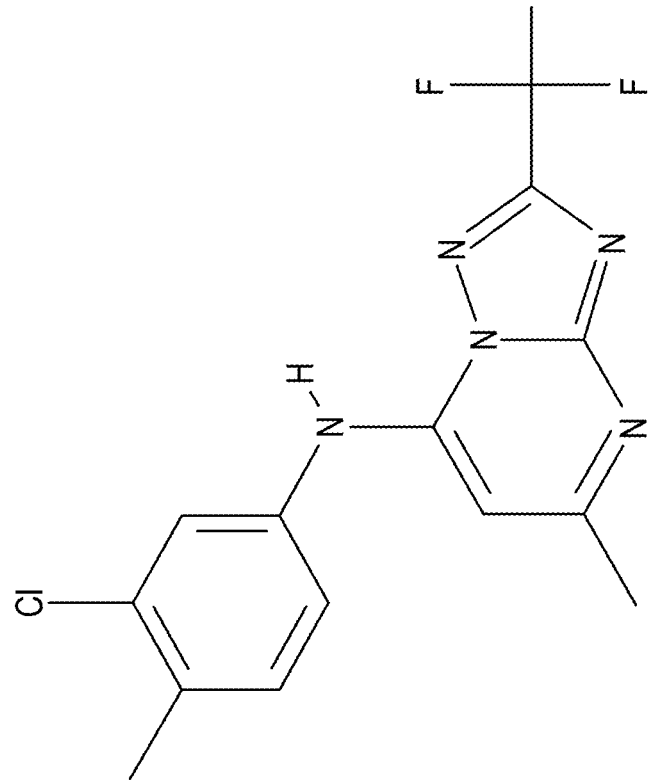
Figure 9H:
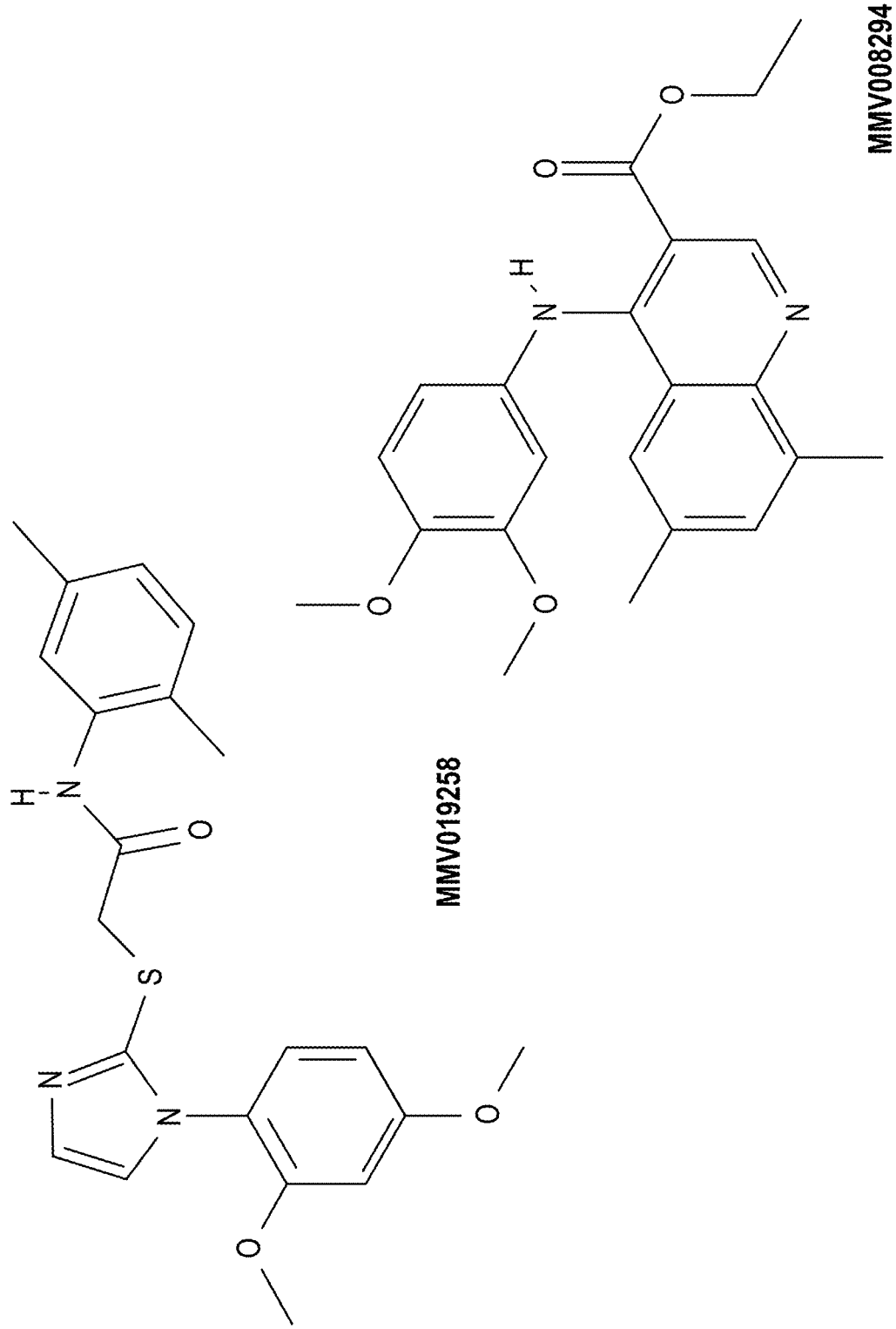
Figure 9I:
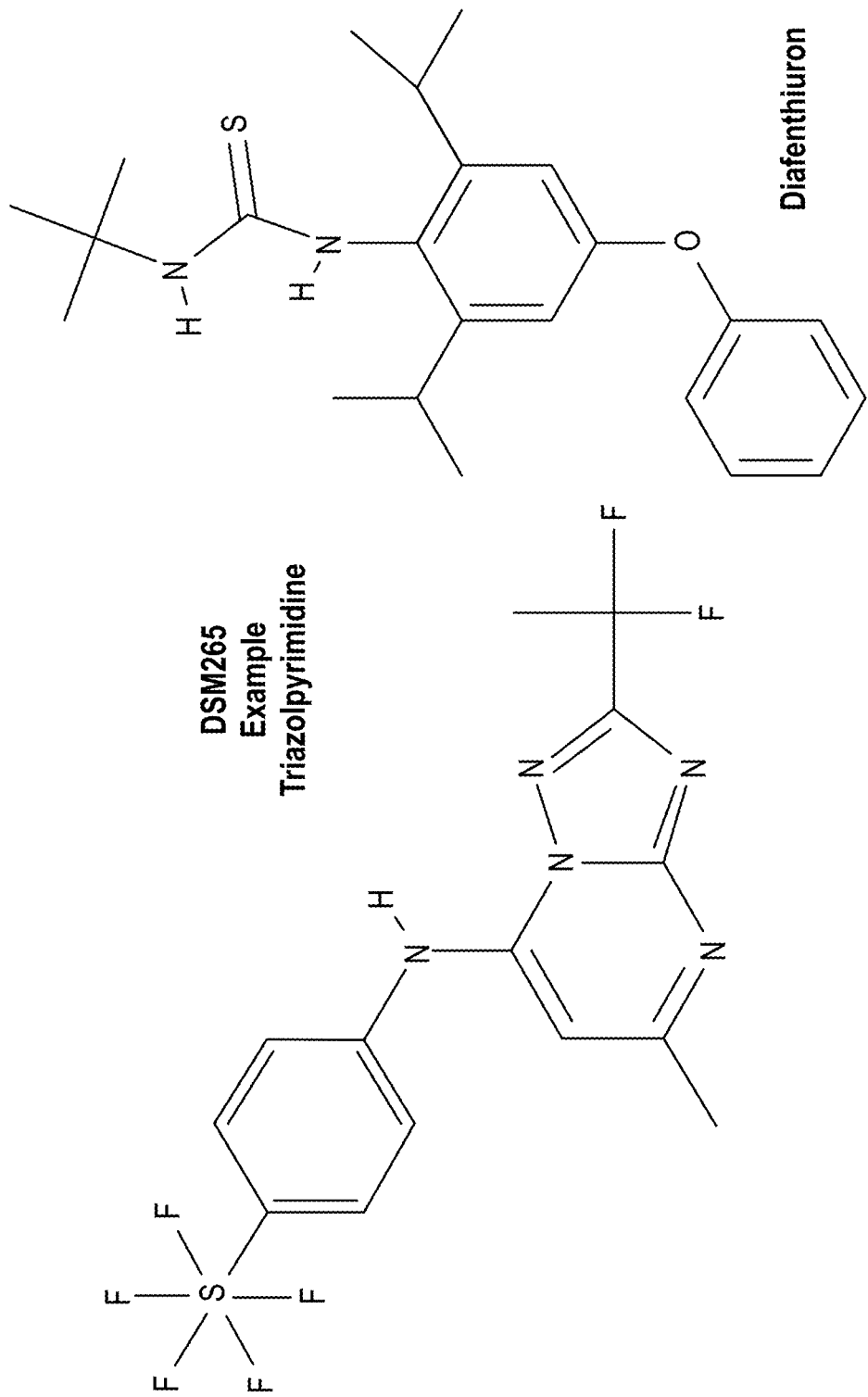
Figure 9J:
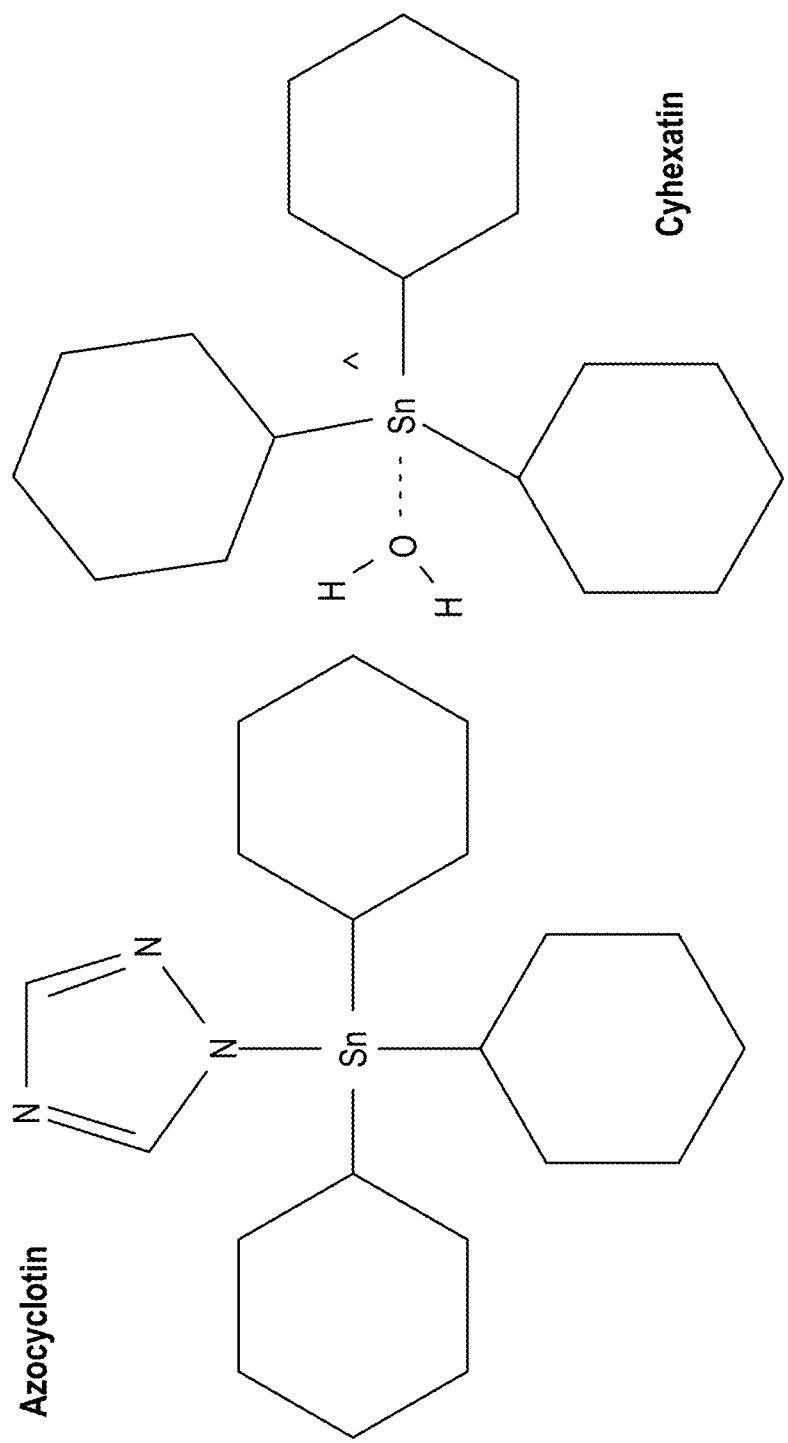
Figure 9K:
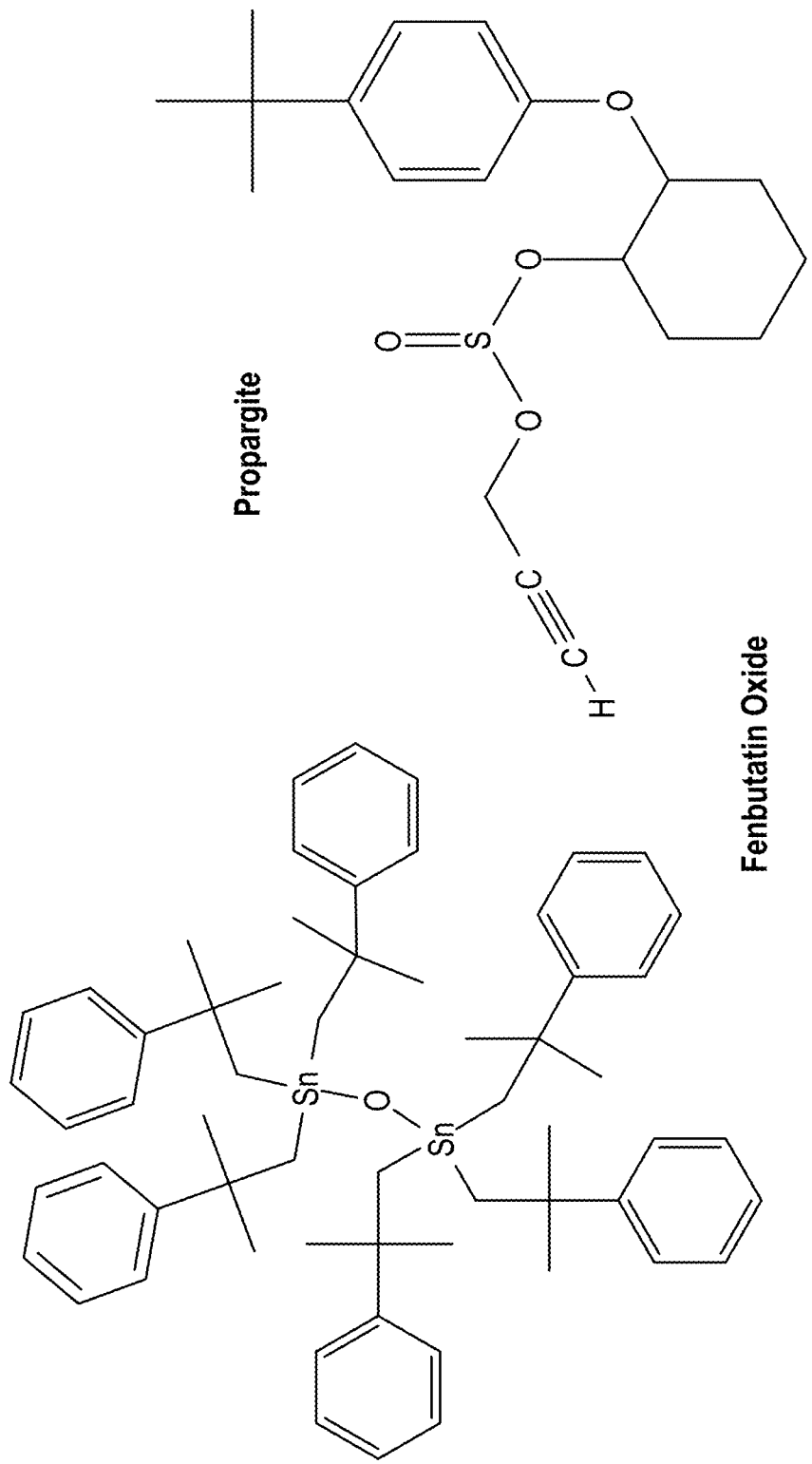
Figure 9L:
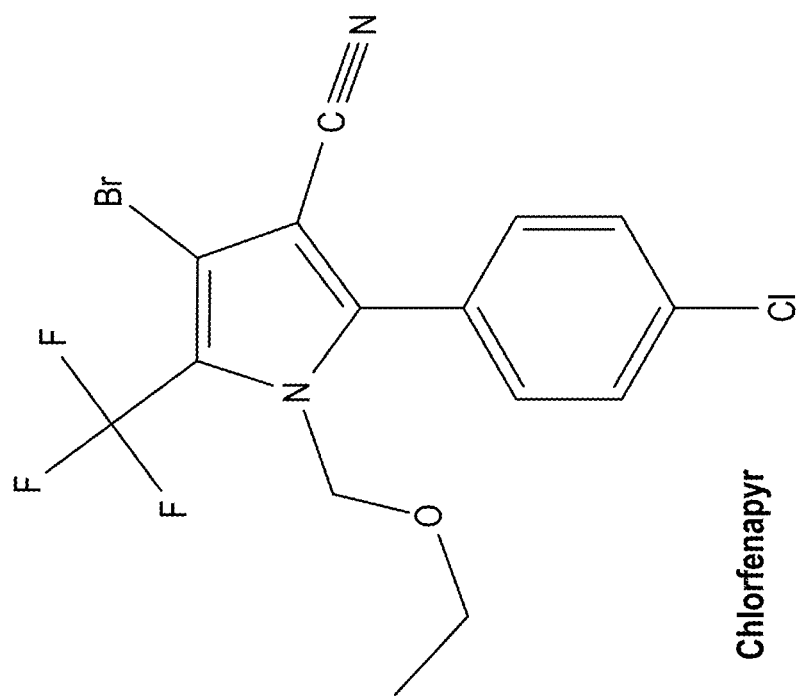
Figure 9L:
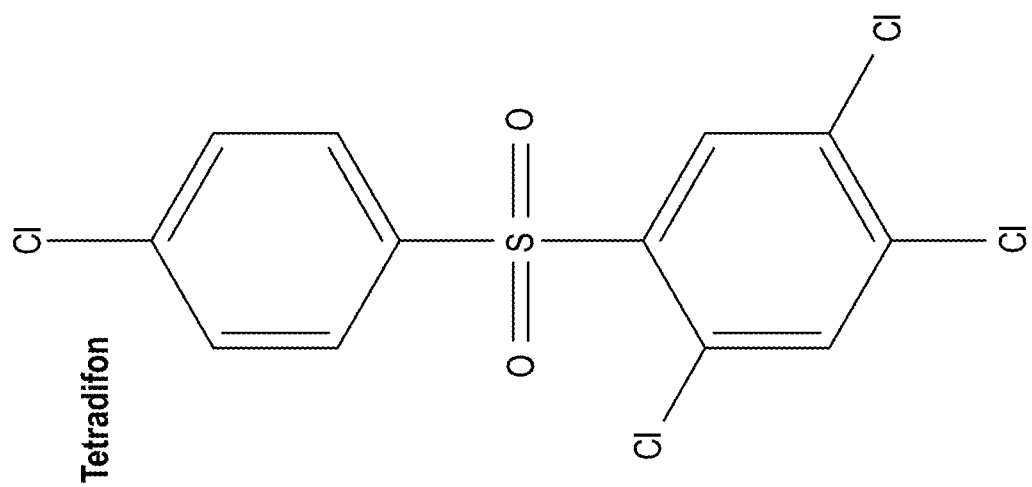
Figure 9M:
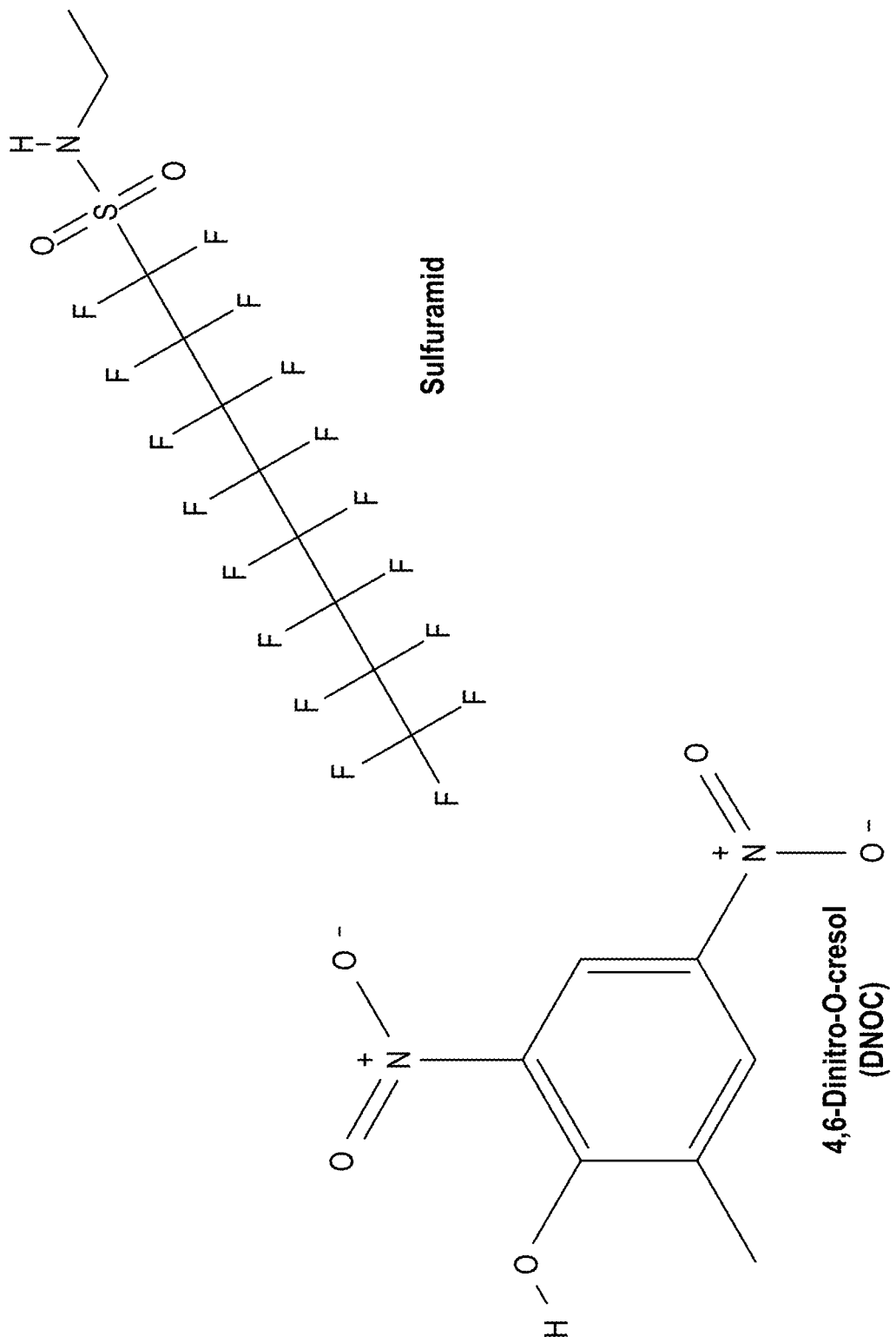
Figure 9N:
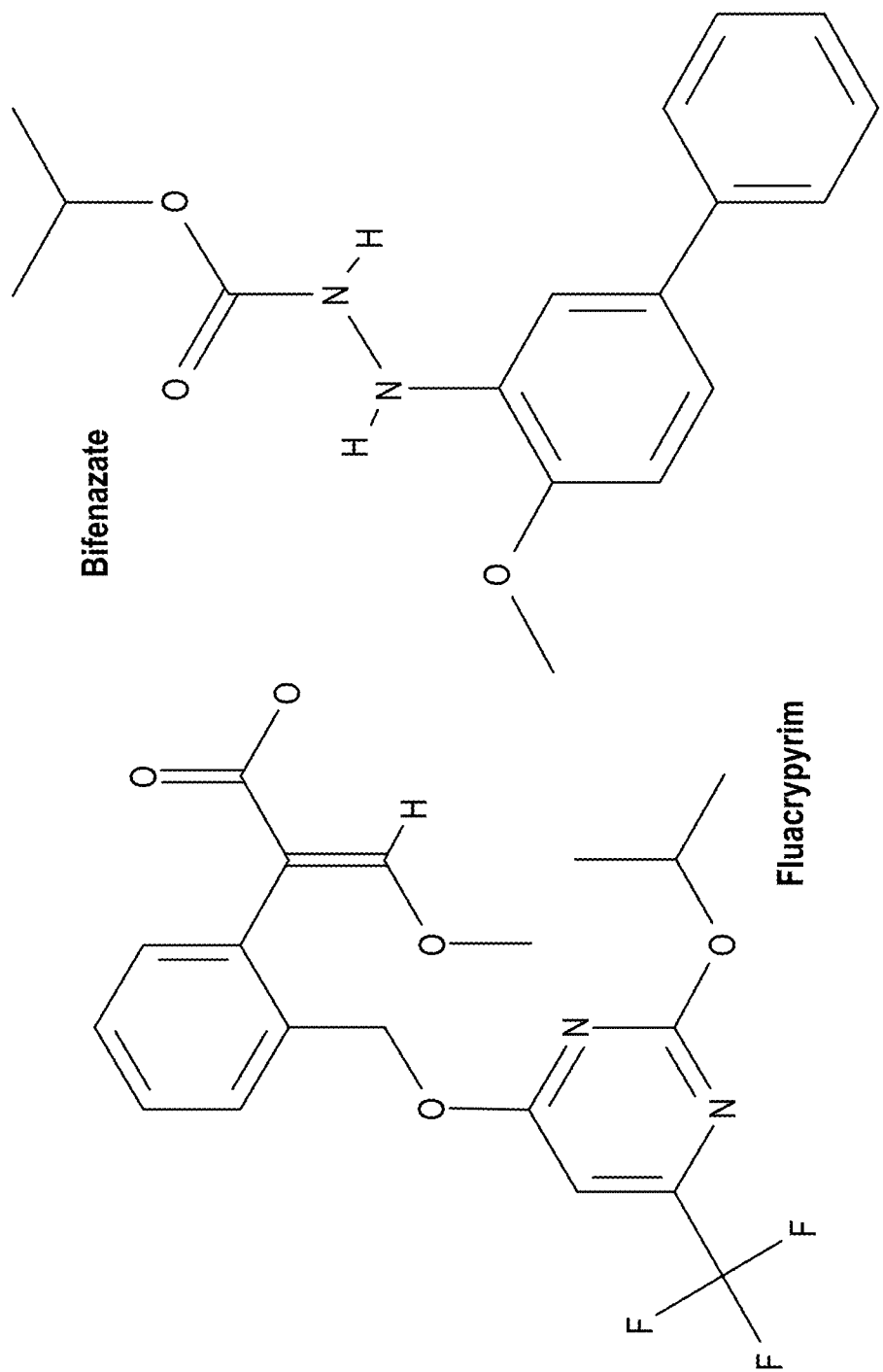
Figure 9O:
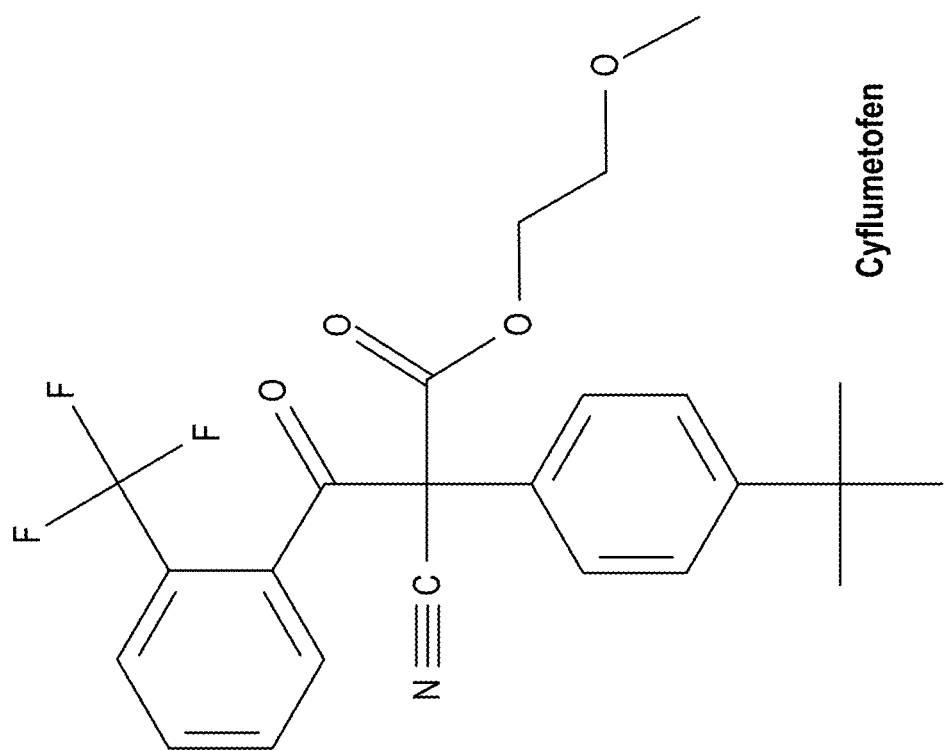
Figure 9O:
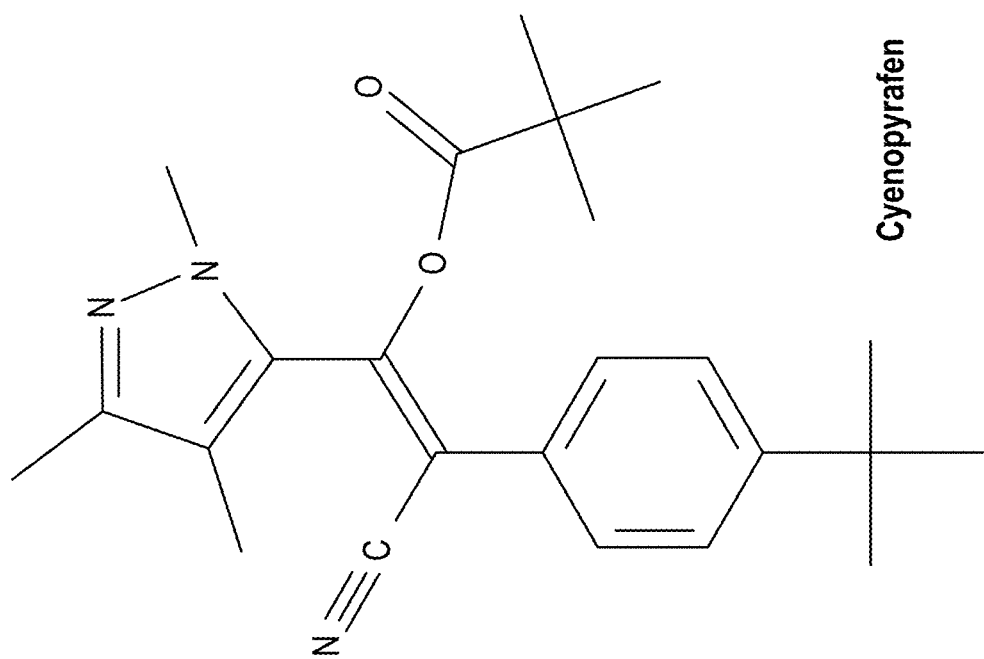
Figure 9P:
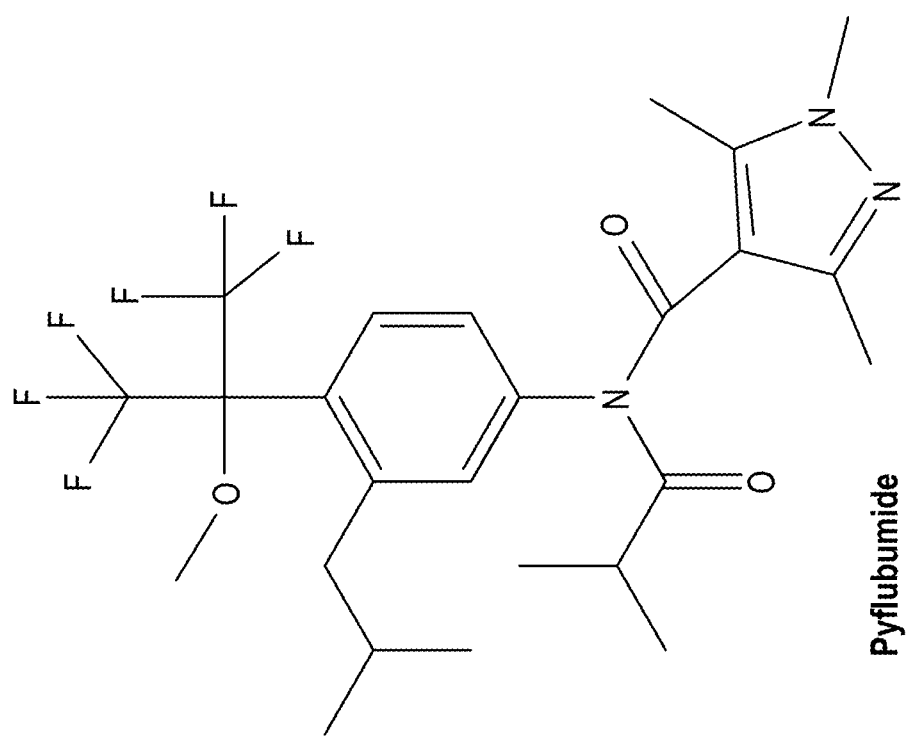
Figure 10B:
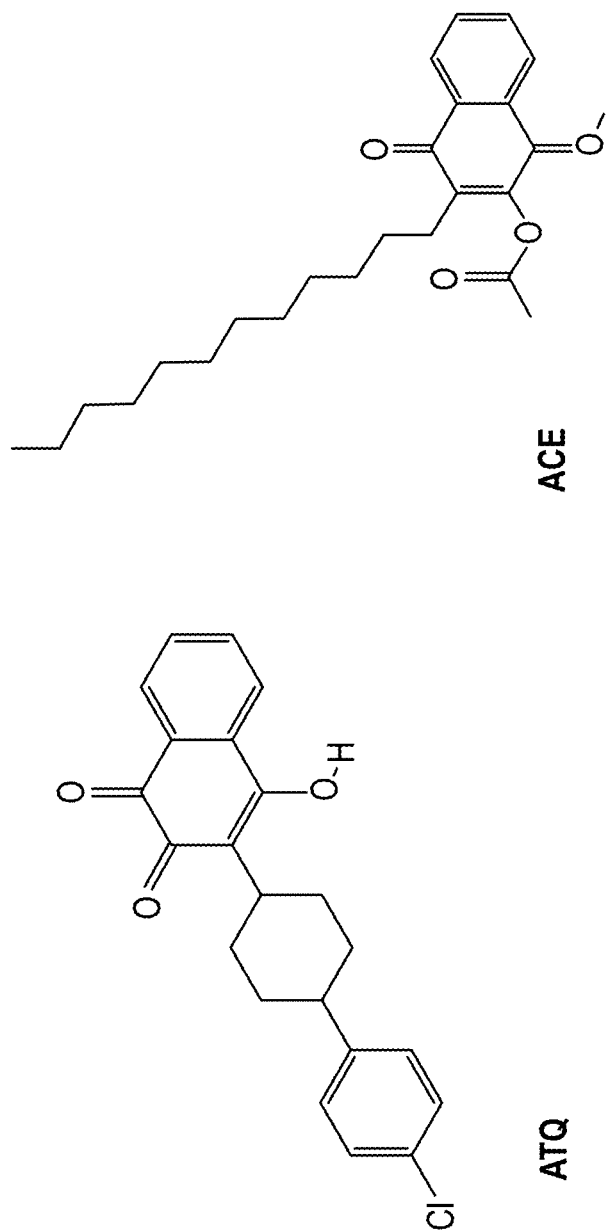
Figure 10C:
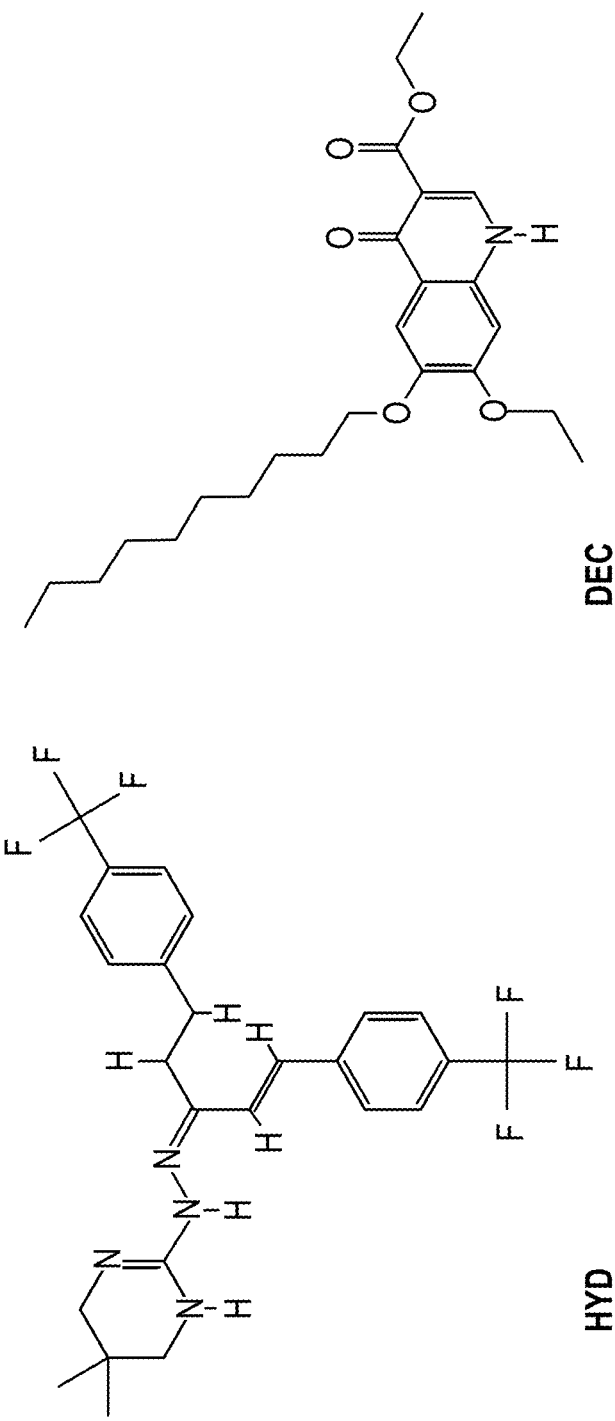
Figure 10D:
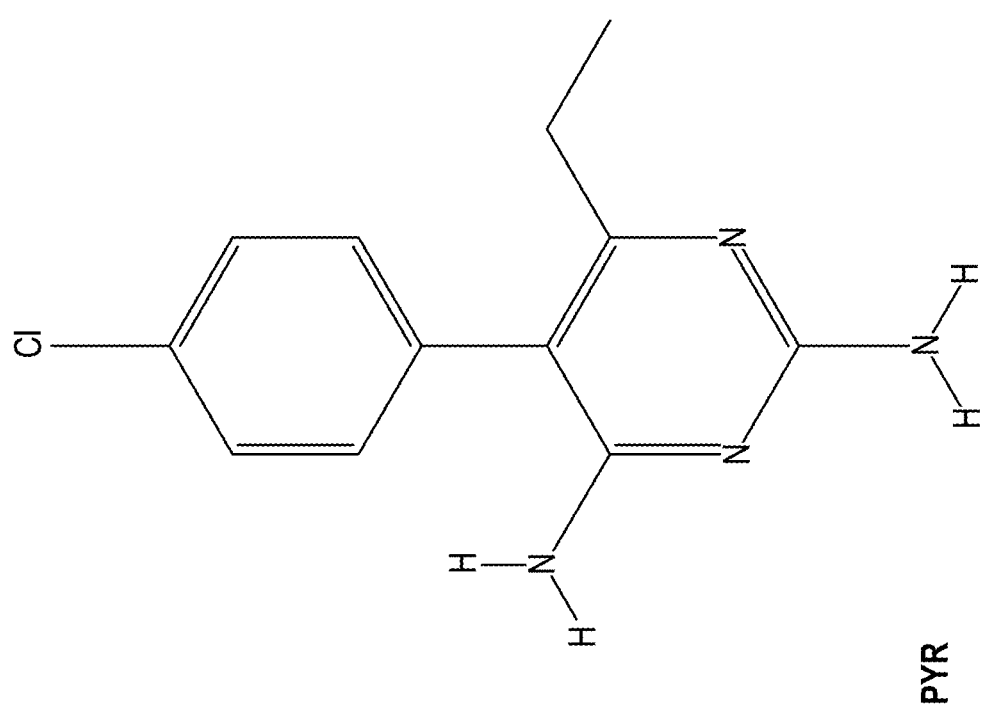

ATQ is used extensively (in combination with proguanil) for prophylaxis in travelers to malaria-endemic areas, and as a stopgap therapy in the case of treatment failure with ACT therapies. This antimalarial acts by displacing ubiquinone (CoQ) from the $Q^O$ site of complex III (Cytochrome $bc_1$) of the mitochondrial electron transport chain (mtETC), disrupting the mitochondrial membrane potential ($\Delta\Psi m$) and thus inhibiting both mitochondrial ATP production (17) and de novo pyrimidine synthesis (18). Additional compounds were next tested with anti-cytochrome B activity not in clinical use, but with potential to be rapidly adapted for use in mosquito-targeting interventions: the registered insecticides acequinocyl (ACE) and hydramethylnon (HYD), and the veterinary drug decoquinate (DEC). the dihydrofolate reductase inhibitor pyrimethamine (PYR) (19), a compound with extremely potent transmission blocking activity in humans that acts by disrupting DNA replication was also included (Table S1). All these compounds have nanomolar activity against P. falciparum asexual stages in vitro (19-21), and they lack acute insecticidal activity against An. gambiae, as determined in experiments presented herein (FIG. 7). Remarkably, HYD and ACE showed strong P. falciparum killing activity, reducing oocyst prevalence by 63.9% and 64.3%, respectively, relative to controls (FIG. 4). DEC and PYR on the other hand had no detectable effect on infection (FIG. 8), possibly due to higher polar surface area relative to ATQ, ACE and HYD—and insecticides used in LLINs—which may have negatively affected uptake (Table S1). These results clearly demonstrate that cytochrome B inhibitors delivered via mosquito nets or other contact-based transmission blocking strategies can effectively curb P. falciparum infection during mosquito stages.

Multiple lines of evidence indicated that the probability of emergence of parasite resistance to cytochrome B inhibitors during mosquito developmental stages would be minimal. Specifically, mutations conferring resistance to ATQ in the P. falciparum erythrocytic cycle lead to parasite arrest early in mosquito infection (22), although partial transmissibility was observed in ATQ-resistant P. berghei parasites (23). Similar developmental arrest during mosquito stages is associated with functional knockout of other components of the mtETC—including Type II NADH dehydrogenase (24), succinate dehydrogenase (complex II) (25) and ATP-synthase (complex V) (26)—which are non-essential for asexual growth. These observations demonstrate the critical role for the mtETC during *P. falciparum* development within the *Anopheles* female, making mitochondrial function an attractive target for the approach described herein. Moreover, mosquito resistance to parasite inhibitors would also be unlikely given the lack of observed fitness costs associated with compound exposure in the *An. gambiae* female, either in terms of fecundity or survival (FIG. 5*a*-5*b*, FIG. 7).

The concept of blocking parasite transmission by targeting *Plasmodium* development in the mosquito vector is not a new one, and investigators have demonstrated as early as 1947 that pamaquine and proquanil included in the mosquito sugar meal could prevent completion of sporogony (27, 28). Malaria control methods are currently being designed to reduce parasite numbers within the *Anopheles* female either via the use of microbes that interfere with *Plasmodium* development (29), or through the genetic modification of entire mosquito populations via gene drive systems that spread genetic factors that kill parasites (30). While promising, these strategies suffer from some fundamental technical and biological hurdles including incomplete transmission blocking activity (29), the existence and spread of gene-drive resistant alleles in mosquito populations (31, 32), and the considerable risk of undesired effects on non-target populations and the environment (33). The study described herein demonstrates the vast potential of anti-parasitic compounds for modern malaria control methods aimed at the *Anopheles* vector, and greatly expand the library of compounds that can be used on bed nets and other mosquito control interventions such as IRS and attractive toxic sugar baits (34). Critically, the use of *Plasmodium* inhibitors on LLINs or IRS could be rapidly integrated into the extensive manufacturing and distribution pipelines already in operation in all malaria-endemic regions, thereby providing a fast, effective and safe tool to accelerate the drive toward malaria elimination.

Materials and Methods

Insect lines and rearing. Mosquitoes used for this study were *Anopheles gambiae* sensu stricto, G3 strain. Adult and larval mosquitoes were maintained in a purpose-built insectary at 27° C.±2 and 80% RH. Larvae were reared from hatching in 1 L ddH$_2$O using an optimized density and feeding regimen. Pupae were collected and placed in cages (Bugdorm™, Megaview Science. Co. Taiwan), and after enclosure adult mosquitoes were provided water and 10% w/v glucose solution ad libitum. For colony maintenance, 5-7 d old adults were provided a blood meal of donated human blood using an artificial membrane feeding system (Hemotek Limited, Great Harwood, UK).

Compound Exposures. Compounds (ATQ, ACE, HYD, PYR, PER, Millipore-Sigma, St. Louis, MO, USA) to be tested were dissolved in a suitable, volatile vehicle (Table S1) at stock concentrations of 3-10 mg/ml (0.3-1% w/v). Working concentrations of each compound were created through serial dilutions. To generate a compound-coated surface, a volume of working solution containing a known quantity of compound was added to 1 ml excess vehicle and transferred to a 6 cm diameter glass petri dish (0.0283 m$^2$). Treated dishes were placed on a lateral shaker and left for 4 h or overnight until evaporation of the volatile vehicle, coating the compound to the glass substrate. Control plates were treated identically using only the acetone vehicle. A translucent plastic cup was placed over the coated surface to contain mosquitoes during exposure. A flap was cut into the base of the cup to allow the introduction of mosquitoes. Plates were used for 1 d and discarded. For exposures, 15-25 mosquitoes were introduced through the cup flap using a mouth aspirator and incubated on the treated surface for 6-60 min depending on the experimental parameters. Exposure plates were agitated once during exposure to discourage resting on the untreated walls and base of the cup. After exposure, plates were transferred to a clean 17.5 cm$^3$ cage (Bugdorm™, Megaview Science. Co. Taiwan).

*Plasmodium falciparum* Infection Assays. 5-d old *An. gambiae* females were exposed to compounds as described above. Immediately after exposure, females were transferred to a sealed, secure infection glovebox and provided an in vitro culture *P. falciparum* (NF54) gametocytes (1, 2) through a custom made, glass, water-heated membrane feeder. After 60 min, females that failed to engorge fully were vacuum aspirated out of their containers directly into 80% ethanol, and discarded. At 7-9 d post infectious blood meal (pIBM), females that had blood fed were vacuum aspirated into 80% ethanol, incubated for 10 minutes at −20° C., and transferred out of the secure feeding box into PBS on ice. Midguts were dissected out in PBS and stained with 0.2% w/v mercurochrome (in ddH$_2$O) for 17 minutes. After staining, midguts were mounted on glass microscope slides in 0.02% w/v mercurochrome, and oocyst prevalence and intensity were determined by examination at 40× air objective on an inverted compound light microscope (Olympus Corporation, Waltham, MA).

Ookinete Immunofluorescent Staining. 21 hr pIBM females (either ATQ- or mock-exposed) were aspirated into PBS at 4° C., beheaded, and transferred to a dissecting microscope. Female midguts including the blood bolus were isolated and transferred to 20 µl PBS on ice. Guts were disrupted by repeated pipetting and the crude isolate homogenized by vortexing briefly (~5 s). 10 µl of the homogenate was spotted onto a poly-L-lysine-coated slide and air-dried. Once dry, the tissues were fixed by incubation with 4% paraformaldehyde (PFA) for 15 minutes. Slides were then rinsed with 0.05% w/v BSA in PBS and stained with a mouse antibody raised against the *P. falciparum* surface protein PfS25 (BEI Resources, Manassas VA, USA). Secondary staining was carried out with a FITC-donkey-anti-mouse antibody (ThermoFisher Scientific, Waltham MA, USA). After staining and rinsing, tissues were mounted in Vectashield™ with DAPI (Vector Laboratories, Burlingame CA, USA) and examined under oil at 63× magnification using a Zeiss Observer.Z1 inverted fluorescent microscope (Carl Zeiss Microscopy GmbH, Jena, Germany).

Survival Assays. To assess acute survival following exposure: 40, females were exposed (as described above) to ATQ, PYR, ACE, HYD permethrin (PER) for 1 h at a dosage of 1 mmol/m$^2$ for each compound. Each exposure had an independent negative control of 40 mock exposed females. Immediately after exposure, each treatment group was transferred to a 500 ml paper cup and provided with glucose. At 48 h post exposure the proportion of surviving mosquitoes in each group was determined. Differences in survival between control and compound-exposed mosquitoes were detected using Chi$^2$ analysis. For long-term survival, ~100 ATQ- or control-exposed females were placed in clean 17.5 cm$^3$ cages (Bugdorm™, Megaview Science. Co., Taiwan). Water and a 10% w/v glucose solution was provided ad libitum. Cages were checked daily for mortality, and dead mosquitos were removed and counted. Each experiment continued until all mosquitoes had died. Differences in median time-to-death between ATQ and control treatment groups were analyzed using a Log-Rank Mantell-Cox test.

Egg development assay. 5-day old females were exposed to ATQ at 1 mmol/m$^2$ for 60 minutes and provided with an infectious blood meal as described above. Gravid females were collected at 3 d pIBM and the ovaries dissected out in 1×PBS. Developed eggs were liberated form the ovarian tissue by gentle agitation with a fine dissection needle and counted.

Statistical Analysis. All statistical analyses were carried out using GraphPad Prism v7.0 for MacOSX (GraphPad Software Inc., La Jolla CA, USA). For infections, differences in prevalence were analyzed by Chi$^2$. In experiments where both treatment groups had individuals that produced >0 oocysts, differences in median oocyst burden between groups (intensity of infection) was analyzed using a Mann-Whitney Mean Ranks test. For multiple comparisons (e.g. FIG. 3) differences in prevalence between multiple groups were determined using pair-wise Chi$^2$ corrected for multiple comparisons (Bonferroni). Similarly, multiple comparisons of intensity were carried out using Wilcoxon with Dunn's post hoc. To determine IC$_{50}$ from dose-response data, the mean relative inhibition (ATQ exposed prevalence/Control prevalence) was calculated for each tested dose and fit with a sigmoidal curve function using non-linear regression.

Modeling. A discrete time model of the mosquito life cycle and malaria transmission was built upon (3). Briefly, mosquitoes progressed through egg, larval, and adult stages, which included four-day gonotrophic cycles (feeding, two days of resting, laying), with a time step of one day (FIG. 6a). Malaria transmission was incorporated through a simple Susceptible-Infectious (SI) framework for human malaria infection. Modifications from the model (3) included (i) the possibility for exposure in every feeding compartment, (ii) a revised formulation of age-dependent adult daily mortality, and (iii) updated computations of the mosquito-human transmission risk functions ($\beta_M$ and $\beta_H$, FIG. 6a-6c). All simulations were carried out using Matlab 2016a. Code is available upon request.

During every feeding, mosquitoes could be exposed to insecticide and/or ATQ. Insecticide caused the death of a fraction of the feeding population, determined by insecticide resistance (the fraction of mosquitoes that are impervious to insecticide) and coverage level. No lasting effects of insecticide were assumed and that mosquito survival after an initial insecticide exposure was not correlated with survival after additional exposures. ATQ induced refractoriness to *Plasmodium falciparum* infection, i.e. 100% protection against infection on the same day of exposure.

Age-dependent mortality for adult mosquitoes was determined by a Gompertz distribution (4, FIG. 5a-5b) with scale parameter b=0.1868 and shape parameter η=0.0293 (FIG. 6b), such that the survival function, i.e. one minus the cumulative distribution function, was $S(x)=\exp(\eta(1-e^{bx}))$.

The daily risk of a human becoming infected was computed using $\beta_H(t)=1-(1-b)^{af(t)}$ where b=0.55 is the probability of infection given a bite from an infectious mosquito (5), a is the bites per human per mosquito, and f(t) is the number of infectious feeders on day t (FIG. 6c(i)). The biting rate a was fitted to give the desired transmission setting in the absence of intervention assuming a larval carrying capacity of $K=5\times10^5$ mosquitoes and a human recovery rate of 25 days. $a=1.1\times10^{-4}$ was found in moderate transmission (45% human infection prevalence (HIP)) and $a=7.6\times10^{-4}$ in high transmission (85% HIP). The daily risk of a mosquito becoming infected was computed with $$\beta_M(t) = k_2\left(1 - \frac{k_1}{k_2 I_H(t) + k_1}\right).$$

$\beta_M$ was restricted to be between 0 and 0.2 by choosing $k_1$=0.02, which controls the initial steepness of the curve, and $k_2$=0.2, which restricts the maximum risk to be ~18% (6, 7) (FIG. 6c(ii)).

When evaluating what happens to each adult mosquito the following ordering occurs:
1. Check if the mosquito dies due to natural mortality in the day interval and remove mosquitoes that die due to natural mortality. The probability of dying due to natural mortality is based on the age of the mosquito.
2. Check if a surviving mosquito is feeding.
If a mosquito is feeding:
   (a) Check if it contacts a bed net. Whether or not it contacts a bed net depends on whether it is in a feeding compartment and the coverage of bed nets in the population.
   If a mosquito contacts a bed net:
      i. Check if it contacts insecticide. If it does contact insecticide, impose mortality according to the efficacy of the insecticide.
      ii. Check if the mosquito contacts atovaquone, assuming it survived contact with insecticide. If it does contact atovaquone, impose protection for the current day
   (b) Check if the mosquito gets infected during this feed. If yes, mark as infected. Note: all mosquitoes that contacted atovaquone are resistant to infection.
   (c) Count how many feeding mosquitoes are infectious. This quantity is used to determine the risk of infection of humans.
3. Determine the number of mosquitoes that are laying eggs by summing all mosquitoes that are in the laying stage.
4. Update internal states of all adult mosquitoes.
   (a) Increase the age of each mosquito by one.
   (b) Decrease the time until in the feeding compartment by one, unless they are currently feeding. If it is currently feeding, reset the counter to one less than the length of the gonotrophic cycle, i.e. 3 days.
   (c) Increase the length of time infected by one, for the infected mosquitoes.
5. Initialize the newly emerged adult mosquitoes.
   (a) Assign half the mosquitoes as mate-first and half as feed-first. This determines the length of time until the first feed.
   (b) Set all ages to one.
   (c) Designate all as not infected and not protected.

REFERENCES

1. S. Bhatt et al., The effect of malaria control on *Plasmodium falciparum* in Africa between 2000 and 2015. *Nature* 526, 207-211 (2015).
2. K. H. Toe et al., Increased Pyrethroid Resistance in Malaria Vectors and Decreased Bed Net Effectiveness, Burkina Faso. *Emerging Infectious Diseases* 20, 1691-1696 (2014).
3. W. Van Bortel et al., The insecticide resistance status of malaria vectors in the Mekong region. *Malar J* 7, 102 (2008).
4. B. M. Ondeto et al., Current status of insecticide resistance among malaria vectors in Kenya. *Parasit Vectors* 10, 429 (2017).
5. C. L. Dykes et al., Knockdown resistance (kdr) mutations in Indian *Anopheles culicifacies* populations. *Parasit Vectors* 8, 333 (2015).
6. K. Raghavendra et al., Chlorfenapyr: a new insecticide with novel mode of action can control pyrethroid resistant malaria vectors. *Malar J* 10, 16 (2011).
7. R. N'Guessan, A. Odjo, C. Ngufor, D. Malone, M. Rowland, A Chlorfenapyr Mixture Net Interceptor® G2 Shows High Efficacy and Wash Durability against Resistant Mosquitoes in West Africa. *PLoS One* 11, e0165925 (2016).
8. C. Ngufor et al., Olyset Duo® (a pyriproxyfen and permethrin mixture net): an experimental hut trial against pyrethroid resistant *Anopheles gambiae* and *Culex quinquefasciatus* in Southern Benin. *PLoS One* 9, e93603 (2014).
9. World Malaria Report 2016. *World Health Organisation*, (2016).
10. World Malaria Report 2017. *World Health Organisation*, (2018).
11. Guidelines for testing mosquito adulticides for indoor residual spraying and treatment of mosquito nets. *World Health Organisation Pesticide Evaluation Schemes*, (2006).
12. H. F. Owusu, N. Chitnis, P. Muller, Insecticide susceptibility of *Anopheles* mosquitoes changes in response to variations in the larval environment. *Sci Rep* 7, 3667 (2017).
13. J. E. Parker et al., Infrared video tracking of *Anopheles gambiae* at insecticide-treated bed nets reveals rapid decisive impact after brief localised net contact. *Sci Rep* 5, 13392 (2015).
14. R. E. Fowler, P. F. Billingsley, M. Pudney, R. E. Sinden, Inhibitory action of the anti-malarial compound atovaquone (566C80) against *Plasmodium berghei* ANKA in the mosquito, *Anopheles stephensi*. *Parasitology* 108 (Pt 4), 383-388 (1994).
15. M. Delves et al., The activities of current antimalarial drugs on the life cycle stages of *Plasmodium*: a comparative study with human and rodent parasites. *PLoS Med* 9, e1001169 (2012).

16. L. M. Childs et al., Disrupting Mosquito Reproduction and Parasite Development for Malaria Control. *PLoS Pathog* 12, e1006060 (2016).
17. I. K. Srivastava, H. Rottenberg, A. B. Vaidya, Atovaquone, a broad spectrum antiparasitic drug, collapses mitochondrial membrane potential in a malarial parasite. *J Biol Chem* 272, 3961-3966 (1997).
18. H. J. Painter, J. M. Morrisey, M. W. Mather, A. B. Vaidya, Specific role of mitochondrial electron transport in blood-stage *Plasmodium falciparum*. *Nature* 446, 88-91 (2007).
19. W. H. Richards, B. K. Maples, Studies on *Plasmodium falciparum* in continuous cultivation. I. The effect of chloroquine and pyrimethamine on parasite growth and viability. *Ann Trop Med Parasitol* 73, 99-108 (1979).
20. T. G. Nam et al., A chemical genomic analysis of decoquinate, a *Plasmodium falciparum* cytochrome b inhibitor. *ACS Chem Biol* 6, 1214-1222 (2011).
21. M. Witschel, M. Rottmann, M. Kaiser, R. Brun, Agrochemicals against malaria, sleeping sickness, leishmaniasis and Chagas disease. *PLoS Negl Trop Dis* 6, e1805 (2012).
22. C. D. Goodman et al., Parasites resistant to the antimalarial atovaquone fail to transmit by mosquitoes. *Science* 352, 349-353 (2016).
23. L. D. Blake et al., Menoctone Resistance in Malaria Parasites Is Conferred by M133I Mutations in Cytochrome b That Are Transmissible through Mosquitoes. *Antimicrob Agents Chemother* 61, (2017).
24. K. E. Boysen, K. Matuschewski, Arrested oocyst maturation in *Plasmodium* parasites lacking type II NADH: ubiquinone dehydrogenase. *J Biol Chem* 286, 32661-32671 (2011).
25. A. Hino et al., Critical roles of the mitochondrial complex II in oocyst formation of rodent malaria parasite *Plasmodium berghei*. *J Biochem* 152, 259-268 (2012).
26. A. Sturm, V. Mollard, A. Cozijnsen, C. D. Goodman, G. I. McFadden, Mitochondrial ATP synthase is dispensable in blood-stage *Plasmodium berghei* rodent malaria but essential in the mosquito phase. *Proc Natl Acad Sci USA* 112, 10216-10223 (2015).
27. L. A. Terzian, A Method for Screening Antimalarial Compounds in the Mosquito Host. *Science* 106, 449-450 (1947).
28. L. A. Terzian, A. B. Weathersby, The action of antimalarial drugs in mosquitoes infected with *Plasmodium falciparum*. *Am J Trop Med Hyg* 29, 19-22 (1949).
29. S. Wang et al., Driving mosquito refractoriness to *Plasmodium falciparum* with engineered symbiotic bacteria. *Science* 357, 1399-1402 (2017).
30. V. M. Gantz et al., Highly efficient Cas9-mediated gene drive for population modification of the malaria vector mosquito *Anopheles stephensi*. *Proc Natl Acad Sci USA* 112, E6736-6743 (2015).
31. A. M. Hammond et al., The creation and selection of mutations resistant to a gene drive over multiple generations in the malaria mosquito. *PLoS Genet* 13, e1007039 (2017).
32. R. L. Unckless, A. G. Clark, P. W. Messer, Evolution of Resistance Against CRISPR/Cas9 Gene Drive. *Genetics* 205, 827-841 (2017).
33. B. L. Webber, S. Raghu, O. R. Edwards, Opinion: Is CRISPR-based gene drive a biocontrol silver bullet or global conservation threat? *Proc Natl Acad Sci USA* 112, 10565-10567 (2015).
34. J. M. Fiorenzano, P. G. Koehler, R. D. Xue, Attractive Toxic Sugar Bait (ATSB) For Control of Mosquitoes and Its Impact on Non-Target Organisms: A Review. *Int J Environ Res Public Health* 14, (2017).
1. W. Trager, J. B. Jensen, Human malaria parasites in continuous culture. Science 193, 673-675 (1976).
2. T. Ifediba, J. P. Vanderberg, Complete in vitro maturation of Plasmodium falciparum gametocytes. Nature 294, 364-366 (1981).
3. L. M. Childs et al., Disrupting Mosquito Reproduction and Parasite Development for Malaria Control. PLoS Pathog 12, e1006060 (2016).
4. C. Christiansen-Jucht, K. Erguler, C. Y. Shek, M. G. Basanez, P. E. Parham, Modelling *Anopheles gambiae* s.s. Population Dynamics with Temperature- and Age-Dependent Survival. Int J Environ Res Public Health 12, 5975-6005 (2015).
5. D. L. Smith, C. J. Drakeley, C. Chiyaka, S. I. Hay, A quantitative analysis of transmission efficiency versus intensity for malaria. Nat Commun 1, 108 (2010).
6. C. Boudin, M. Olivier, J. F. Molez, J. P. Chiron, P. Ambroise-Thomas, High human malarial infectivity to laboratory-bred *Anopheles gambiae* in a village in Burkina Faso. Am J Trop Med Hyg 48, 700-706 (1993).
7. G. F. Killeen, A. Ross, T. Smith, Infectiousness of malaria-endemic human populations to vectors. Am J Trop Med Hyg 75, 38-45 (2006).

The invention claimed is:

1. A method for reducing transmission of *Plasmodium* to a female mosquito, the method comprising: contacting a female mosquito with a composition comprising an effective amount at least one *Plasmodium* transmission blocking compound, wherein the at least one *Plasmodium* transmission blocking compound is selected from the group consisting of atovaquone (ATQ), acequinocyl (ACE), and hydramethylnon (HYD), wherein the survival rate of the mosquito is not impacted by the contacting.

2. The method of claim 1, wherein the contacting comprises topical contacting or tarsal contacting.

3. The method of claim 2, wherein the tarsal contact comprises tarsal absorption or ingestion of the at least one *Plasmodium* transmission blocking compound, wherein the at least one *Plasmodium* transmission blocking compound is selected from the group consisting of atovaquone (ATQ), acequinocyl (ACE), and hydramethylnon (HYD).

4. The method of claim 1, wherein the contacting occurs on a surface coated with the at least one *Plasmodium* transmission blocking compound, wherein the at least one *Plasmodium* transmission blocking compound is selected from the group consisting of atovaquone (ATQ), acequinocyl (ACE), and hydramethylnon (HYD).

5. The method of claim 4, wherein the surface is selected from the group consisting of: an interior wall of a building; an exterior wall of a building; a bed net; an indoor fabric; an outdoor fabric; clothing; inside a trap; and outside a trap.

6. The method of claim 1, wherein reducing transmission inhibits the zygote/ookinete transition of *Plasmodium* development or in the inhibition of *Plasmodium* ookinete development.

7. The method of claim 1, wherein the female mosquito has been infected with *Plasmodium* prior to contacting.

8. The method of claim 1, wherein the composition further comprises at least one of a cuticular/tarsal uptake enhancer and a cytochrome P450 inhibitor.

9. The method of claim 8, wherein the cuticular/tarsal uptake enhancer comprises a mixture of the methyl esters of saturated and unsaturated C10-C26 fatty acids or rapeseed methyl ester.

10. The method of claim 8, wherein the cytochrome p450 inhibitor is at least one of piperonyl butoxide and 1-aminobenzotriazole.

\* \* \* \* \*